US012614109B1

(12) United States Patent
Donovan

(10) Patent No.: US 12,614,109 B1
(45) Date of Patent: Apr. 28, 2026

(54) AI PLATFORM WITH AUTOMATIC ANALYSIS DATA AND METHODS FOR USE THEREWITH

(71) Applicant: Virtuous AI, Inc., Los Gatos, CA (US)

(72) Inventor: Rory Donovan, Rancho Cucamonga, CA (US)

(73) Assignee: Virtuous AI, Inc., Campbell, CA (US)

( * ) Notice: Subject to any disclaimer, the term of this patent is extended or adjusted under 35 U.S.C. 154(b) by 908 days.

(21) Appl. No.: 17/820,407

(22) Filed: Aug. 17, 2022

Related U.S. Application Data

(60) Provisional application No. 63/262,397, filed on Oct. 12, 2021, provisional application No. 63/262,395, filed on Oct. 12, 2021, provisional application No. 63/262,396, filed on Oct. 12, 2021.

(51) Int. Cl.
| | |
|---|---|
| *G06Q 30/0201* | (2023.01) |
| *G06F 9/451* | (2018.01) |
| *G06N 5/045* | (2023.01) |
| *G06N 20/00* | (2019.01) |
| *G06Q 10/0639* | (2023.01) |

(52) U.S. Cl.
CPC ............. *G06N 20/00* (2019.01); *G06F 9/451* (2018.02); *G06N 5/045* (2013.01); *G06Q 10/06393* (2013.01); *G06Q 30/0201* (2013.01)

(58) Field of Classification Search
CPC ........ G06N 20/00; G06N 5/045; G06F 9/451; G06Q 10/06393; G06Q 30/0201
See application file for complete search history.

(56) References Cited

U.S. PATENT DOCUMENTS

| | | | |
|---|---|---|---|
| 8,221,238 B1 | 7/2012 | Shaw | |
| 10,671,854 B1 | 6/2020 | Mahyar | |
| 10,905,962 B2 | 2/2021 | Kaethler | |
| 11,052,311 B2 | 7/2021 | Bleasdale | |
| 12,147,906 B2 * | 11/2024 | Saha ......................... | G06N 5/01 |

(Continued)

FOREIGN PATENT DOCUMENTS

| WO | 2020092956 A1 | 5/2020 |
|---|---|---|

OTHER PUBLICATIONS

Bellamy, et al.; AI Fairness 360: An Extensible Toolkit for Detecting, Understanding, and Mitigating Unwanted Algorithmic Bias; Oct. 3, 2018; pp. 1-20 [retrieved from the internet: https://arxiv.org/pdf/1810.01943 on Dec. 12, 2024].

(Continued)

*Primary Examiner* — Beau D Spratt
(74) *Attorney, Agent, or Firm* — Katz Ruby & Carle LLP; Katherine C. Stuckman; Bruce E. Stuckman

(57) ABSTRACT
A system operates by: generating, via a machine that includes at least one processor and a non-transitory machine-readable storage medium and utilizing a graphical user interface, a content analysis control panel; receiving, via the machine, content data; detecting, via one or more AI models implemented via the machine, detection data that includes first portions of the content data associated with a protected attribute and second portions of the content data associated with a predetermined metric; generating, via the machine, analysis data associated with the protected attribute and the predetermined metric; and facilitating display, via the content analysis control panel, the analysis data associated with the protected attribute and the predetermined metric.

20 Claims, 47 Drawing Sheets

(56)  References Cited

U.S. PATENT DOCUMENTS

| | | | | |
|---|---|---|---|---|
| 2006/0121990 | A1 | 6/2006 | O'Kelley | |
| 2006/0247055 | A1 | 11/2006 | O'Kelley | |
| 2006/0287096 | A1 | 12/2006 | O'Kelley | |
| 2009/0234663 | A1 | 9/2009 | McCann | |
| 2009/0325709 | A1 | 12/2009 | Shi | |
| 2012/0233084 | A1* | 9/2012 | Sardonis | G06Q 10/06 |
| | | | | 705/326 |
| 2013/0138506 | A1* | 5/2013 | Zhu | G06Q 30/0241 |
| | | | | 705/14.66 |
| 2017/0372206 | A1* | 12/2017 | Kavadiki | G06N 20/00 |
| 2018/0373781 | A1 | 12/2018 | Palrecha | |
| 2019/0028336 | A1 | 1/2019 | Coronado et al. | |
| 2019/0213498 | A1 | 7/2019 | Adjaoute | |
| 2019/0238934 | A1 | 8/2019 | Yun | |
| 2019/0266912 | A1 | 8/2019 | Barzman | |
| 2019/0291008 | A1 | 9/2019 | Cox | |
| 2020/0078688 | A1 | 3/2020 | Kaethler | |
| 2020/0142999 | A1 | 5/2020 | Pedersen | |
| 2020/0250525 | A1 | 8/2020 | Kumar Addepalli et al. | |
| 2020/0302524 | A1* | 9/2020 | Kamkar | G06N 3/09 |
| 2020/0364727 | A1 | 11/2020 | Scott-Green | |
| 2021/0004440 | A1 | 1/2021 | Purnell | |
| 2021/0038979 | A1 | 2/2021 | Bleasdale | |
| 2021/0133870 | A1* | 5/2021 | Kamkar | G06Q 40/03 |
| 2021/0168166 | A1 | 6/2021 | Liu | |
| 2021/0299576 | A1 | 9/2021 | Donovan | |
| 2021/0374886 | A1* | 12/2021 | Reitz | G06Q 50/163 |
| 2022/0300850 | A1* | 9/2022 | Mendez | G06F 8/34 |
| 2022/0343179 | A1* | 10/2022 | Saha | G06N 5/01 |
| 2022/0377083 | A1 | 11/2022 | Kim | |
| 2023/0076049 | A1* | 3/2023 | Chen | G06Q 10/1053 |
| 2024/0079145 | A1* | 3/2024 | Conward | G16H 50/20 |

OTHER PUBLICATIONS

European Patent Office; Extended European Search Report; Jan. 2, 2025; 8 pgs.

Hendrycks et al.; Aligning AI with Shared Human Values; arXiv:2008. 02275v5, Jul. 2021; 30 pgs.

International Searching Authority; International Search Report and Written Opinion; International Application No. PCT/US2022/ 041024; Dec. 21, 2022; 11 pgs.

* cited by examiner

850

865

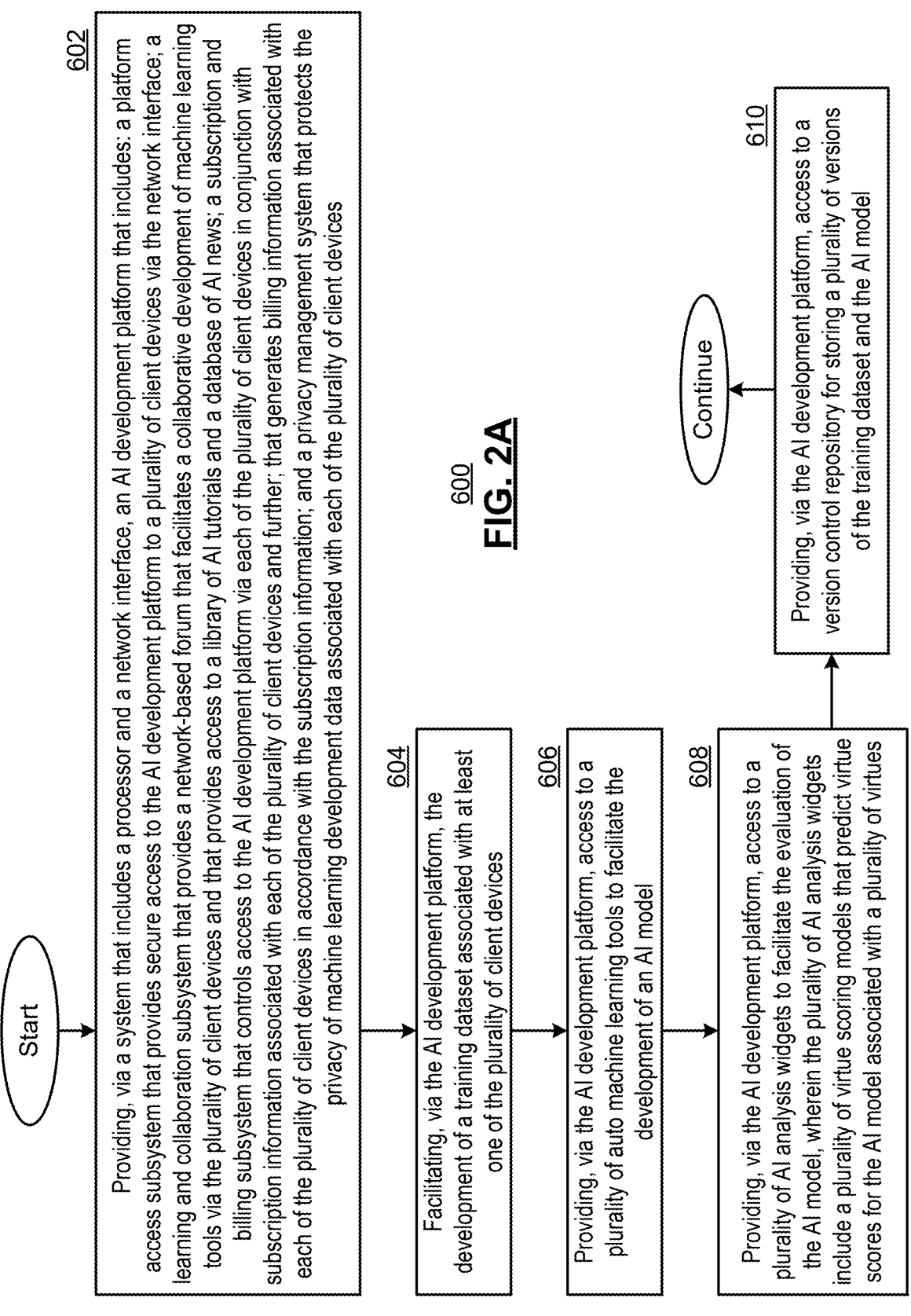

Start

602

Providing, via a system that includes a processor and a network interface, an AI development platform that includes: a platform access subsystem that provides secure access to the AI development platform to a plurality of client devices via the network interface; a learning and collaboration subsystem that provides a network-based forum that facilitates a collaborative development of machine learning tools via the plurality of client devices and that provides access to a library of AI tutorials and a database of AI news; a subscription and billing subsystem that controls access to the AI development platform via each of the plurality of client devices in conjunction with subscription information associated with each of the plurality of client devices and further; that generates billing information associated with each of the plurality of client devices in accordance with the subscription information; and a privacy management system that protects the privacy of machine learning development data associated with each of the plurality of client devices

604

Facilitating, via the AI development platform, the development of a training dataset associated with at least one of the plurality of client devices

606

Providing, via the AI development platform, access to a plurality of auto machine learning tools to facilitate the development of an AI model

608

Providing, via the AI development platform, access to a plurality of AI analysis widgets to facilitate the evaluation of the AI model, wherein the plurality of AI analysis widgets include a plurality of virtue scoring models that predict virtue scores for the AI model associated with a plurality of virtues

610

Providing, via the AI development platform, access to a version control repository for storing a plurality of versions of the training dataset and the AI model Continue

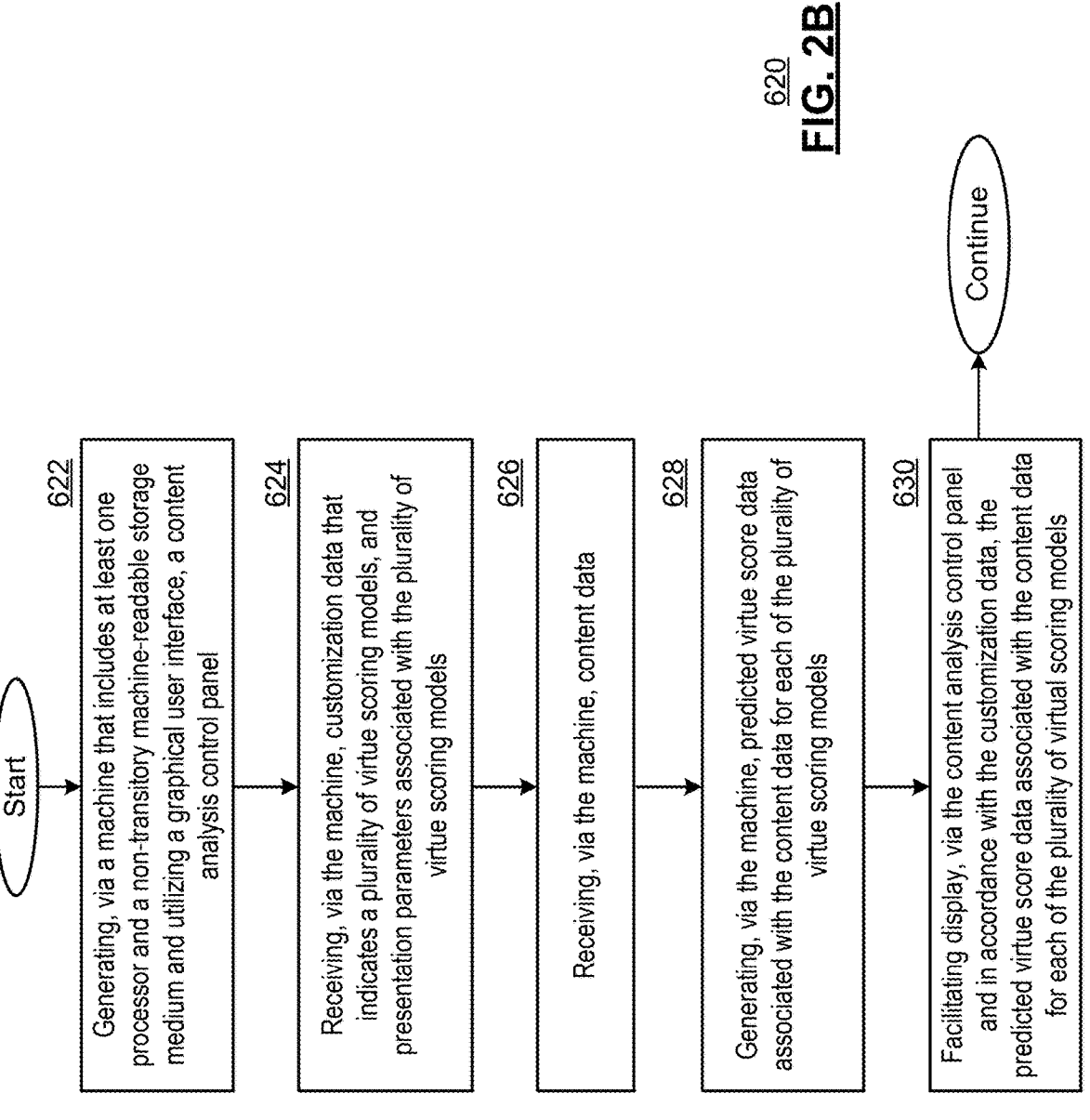

Start

622

Generating, via a machine that includes at least one processor and a non-transitory machine-readable storage medium and utilizing a graphical user interface, a content analysis control panel

624

Receiving, via the machine, customization data that indicates a plurality of virtue scoring models, and presentation parameters associated with the plurality of virtue scoring models

626

Receiving, via the machine, content data

628

Generating, via the machine, predicted virtue score data associated with the content data for each of the plurality of virtue scoring models

630

Facilitating display, via the content analysis control panel and in accordance with the customization data, the predicted virtue score data associated with the content data for each of the plurality of virtual scoring models Continue

Figure 4V:
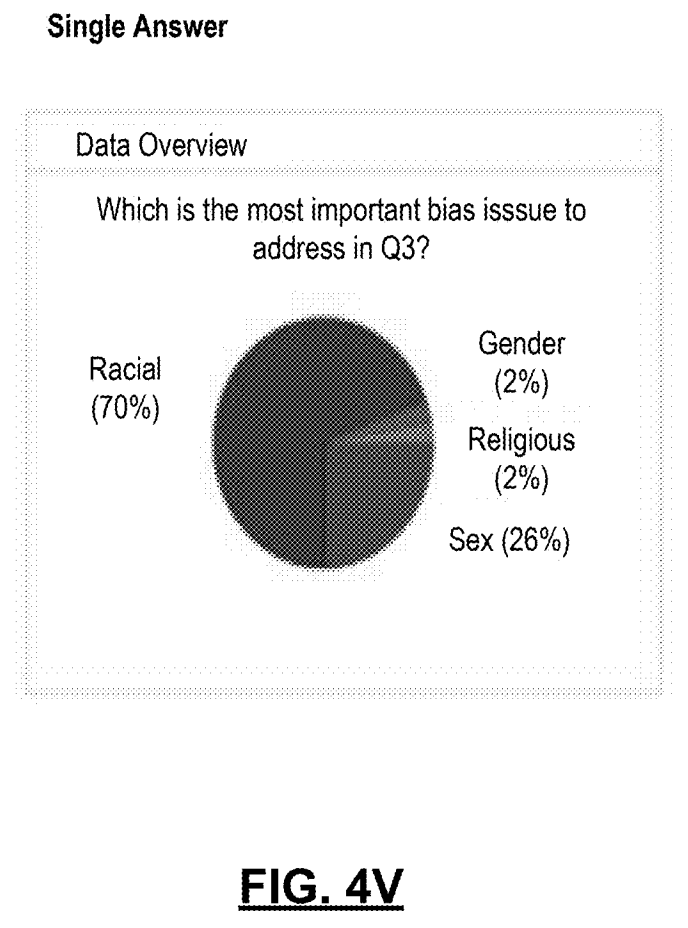

Single Answer

Data Overview

Which is the most important bias isssue to address in Q3?

Gender (2%)

Religious (2%)

Sex (26%)

Racial (70%)

AI PLATFORM WITH AUTOMATIC ANALYSIS DATA AND METHODS FOR USE THEREWITH

CROSS-REFERENCE TO RELATED APPLICATIONS

The present U.S. Utility Patent Applications claims priority pursuant to 35 U.S.C. § 119 (e) to U.S. Provisional Application No. 63/262,395, entitled "AI PLATFORM WITH CUSTOMIZABLE CONTENT ANALYSIS CONTROL PANEL AND METHODS FOR USE THEREWITH", filed Oct. 12, 2021; U.S. Provisional Application No. 63/262,396, entitled "AI PLATFORM WITH CUSTOMIZABLE VIRTUE SCORING MODELS AND METHODS FOR USE THEREWITH", filed Oct. 12, 2021; and U.S. Provisional Application No. 63/262,397, entitled "AI PLATFORM WITH AUTOMATIC ANALYSIS DATA AND METHODS FOR USE THEREWITH", filed Oct. 12, 2021, all of which are hereby incorporated herein by reference in their entirety and made part of the present U.S. Utility Patent Application for all purposes.

TECHNICAL FIELD

The present disclosure relates to processing systems and applications used in the development, analysis and/or use of artificial intelligence models or other content.

BRIEF DESCRIPTION OF THE SEVERAL VIEWS OF THE DRAWINGS

FIG. 2A presents a flowchart representation of an example method.

FIG. 2B presents a flowchart representation of an example method.

DETAILED DESCRIPTION

Figure 1A:
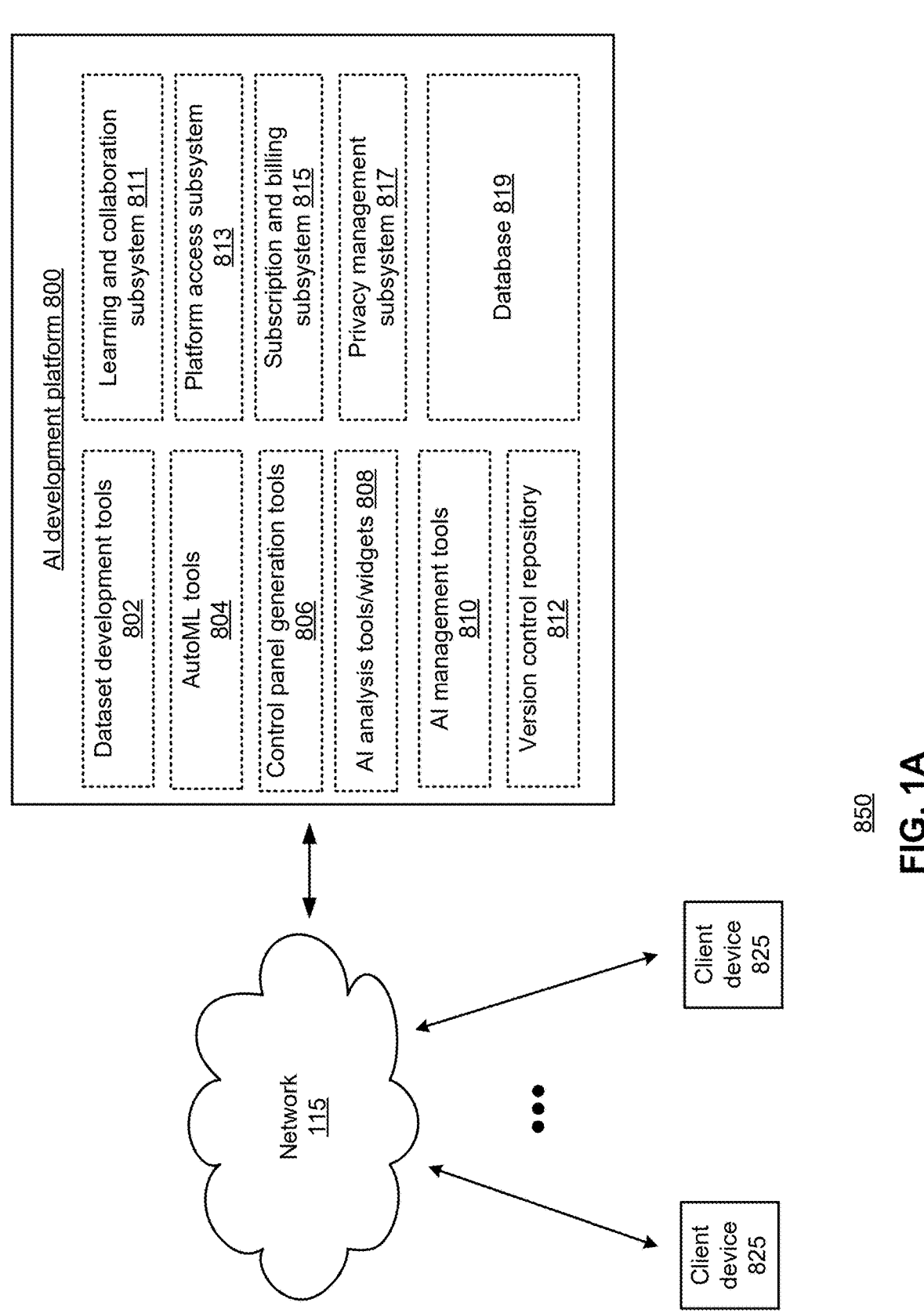
FIG. 1A presents a block diagram representation of an example system.

FIG. 1A presents a block diagram representation of an example system in accordance with various embodiments. In particular, a system 850 is presented that includes an AI development platform 800 that communicates with client devices 825 via a network 115. The network 115 can be the Internet or other wide area or local area network, either public or private. The client devices 825 can be computing devices of users such as AI developers or administrators of databases, social media platforms or other sources of AI or media content.

As AI development accelerates at an unprecedented rate, many machine learning (ML) Engineers are beginning to require knowledge in a diverse range of fields including AI ethics, MLOps, and AutoML. Currently there is just scattered, disparate toolkits, which can lead developers to make poor decisions due to lack of experience and accountability.

There is also increased regulation requirements under way by places like the EU and potential need to meet some standards of quality in the near future. IBM has Fairness 360 for bias. IBM also has the Explainability Toolkit for increasing transparency. There is Audit-AI for statistical bias detection. Lime has software for visualizing bias to increase fairness. There is SHAP that uses game theory for explain output of black box model. There is XAI for dynamic systems. The problem is that most AI developers do not want to switch from one platform or toolkit, to another, and another again. The AI development platform 800 and system 850 makes these technological improvements to computer technology by reworking the AI infrastructure from the ground up, building AI ethics into the work experience, and streamlining the process to achieve safe and effective algorithms for ML developers. It provides a "one stop shop" to building robust and certifiable AI systems. Although the primary goal of the AI development platform 800 is to provide a software as a service (SaaS) platform to an ethical AI community, it may be used in conjunction with social media platforms such as Instagram, Facebook, LinkedIn, GitHub, etc. This platform could also be used by AI ethicists to audit their own systems of AI development. Users can use the framework and publicly post their decisions along the way for human in the loop feedback from a community through the posting of problems, questions, reviews, etc. Furthermore, the systems described herein improve computer technology by providing a user interface with many new features and combinations that improve the user experience, increase user efficiency and generate more accurate, more robust and more virtuous results.

The AI development platform 800 includes:

a. a platform access subsystem 813 that provides secure access to the AI development platform to a plurality of client devices 825 via the network 115;

b. a learning and collaboration subsystem 811 that provides a network-based forum that facilitates a collaborative development of machine learning models or other AI tools via the plurality of client devices 825 and that, for example, provides access to a library of AI tutorials, a database of AI news, a forum for questions and answers regarding machine learning, including the use of specific machine learning techniques and/or whether or not particular process is fair, biased, transparent, secure, safe, etc., and/or a database of documentation regarding the AI development platform 800 including, for example, instructions on what the platform is, why it is, what is in it, who it is for, when to use it, and how to use it and further including instructions on the use of the various and subsystems, and/or how to access and operate the various customizations, interconnected tools/widgets and other features via the AI development platform 800;

c. a subscription and billing subsystem 815 that controls access to the AI development platform 800 via each of the plurality of client devices 825 in conjunction with subscription information associated with each of the plurality of client devices 825 and further, that generates billing information associated with each of the plurality of client devices 825 in accordance with the subscription information; and d. a privacy management system 817 that protects the privacy of machine learning development data associated with each of the plurality of client devices 825.

In operation, the AI development platform 800 facilitates the development of a training dataset associated with at least one of the plurality of client devices 825 via dataset development tools 802. The resulting dataset can be stored, for example, in a database 819 associated with the AI development platform 800. The AI development platform 800 also provides access to a plurality of auto machine learning tools 804, such as DataRobot, H2O.ai and/or other auto machine learning tools to facilitate the development of an AI model. The AI development platform 800 includes a set of control panel generation tools 806 that facilitate the generation and user-customization of a graphical user interface (GUI) based content analysis control panel.

The AI development platform 800 also includes a plurality of AI analysis tools/widgets 808 that implement, for example, auto detection and mapping tools such as AI models, statistical functions or other AI or functions that analyze input datasets to automatically identify and/or map data associated with protected attributes, key performance indicators and/or other metrics. In addition, the AI analysis tools/widgets 808 can also include a plurality of standard virtue scoring models that each generate a corresponding virtue score. Examples of such standard virtue scoring models include a responsibility model, an equitability (or bias) model, a reliability model, an explainability model, a robustness model, a traceability model and/or other models that generate virtue scores such as a responsibility score, an equitability (or bias) score, a reliability score, an explainability score, and/or other morality or virtue score. In addition, the AI analysis tools/widgets 808 can include tools to facilitate the generation of one or more virtue scoring models, such as ML or other AI models that are generated based on survey data and the collection of corresponding survey results. Furthermore, the AI analysis tools/widgets 808 can include survey widgets and other tools to facilitate the generation of user-customized virtue scoring models that can differ from each of the standard virtue scoring models, and that are implemented via ML or other AI models that are generated based on user-customized survey data and the collection of corresponding survey results.

The AI development platform 800 also provides access to a version control repository 812, such as a Git repository or other version control system for storing and managing a plurality of versions of the training dataset and the AI model. The AI development platform 800 also provides access to one or more machine learning management tools 810 to perform other management operations associated with the AI model, training dataset, etc.

In operation, the content analysis control panel generated via the set of control panel generation tools 806 operates in conjunction with the AI analysis tools/widgets 808 to provide a graphical user interface that aids the user by gathering and presenting AI data and/or other content for analysis, the creation of custom virtue scoring models, the selection of particular virtue scoring models (either custom or preset) to be used, and the presentation of virtue scores and other analysis results. For example, the content analysis control panel operates via the control panel generation tools 806 and associated AI analysis tools/widgets 808 to:

guide the user through customization of control panel settings and customization parameters used to generate the content analysis control panel;

facilitate the selection of data sets from an AI model or content source in addition to the selection of protected attributes, key performance indicators and/or other metrics;

identify, map and present data associated with the protected attributes, key performance indicators and/or other metrics including a customized selection of statistics, charts, graphs and/or other visualizations;

facilitate the generation of survey data and collection of survey results data to facilitate the generation of custom and/or standard virtue scoring models;

generate and present virtue scores associated with a selected group of customized and/or standard virtue scoring models including a customized selection of statistics, charts, graphs and/or other visualizations of each score; and generate and present suggested improvements to any of the virtue scores associated with any of a selected group of virtue scoring models.

In an example of operation, the AI development platform 800 operates to perform operations that include:

generating, via a machine that includes at least one processor and a non-transitory machine-readable storage medium and utilizing a graphical user interface, a content analysis control panel;

receiving, via the machine, customization data that indicates a plurality of virtue scoring models, and presentation parameters associated with the plurality of scoring models;

receiving, via the machine, content data from an AI model or media source;

generating, via the machine, predicted virtue score data associated with the content data for each of the plurality of virtue scoring models; and facilitating display, via the content analysis control panel and in accordance with settings and other customization data, the predicted virtue score data associated with the content data for each of the plurality of virtue scoring models.

In another example of operation, the AI development platform 800 operates to perform operations that include:

generating, via a machine that includes at least one processor and a non-transitory machine-readable storage medium and utilizing a graphical user interface, custom survey data in response to user interactions with the graphical user interface;

receiving, via the machine and responsive to the custom survey data, survey results data;

generating, utilizing machine learning and via the machine, a customized virtue scoring model based on the custom survey data and the survey results data;

receiving, via the machine, content data from an AI model or media source;

generating, via the machine and utilizing the customized virtue scoring model, predicted virtue score data associated with the content data; and facilitating display, via the graphical user interface, the predicted virtue score data associated with the content data.

In a further example of operation, the AI development platform 800 operates to perform operations that include:

generating, via a machine that includes at least one processor and a non-transitory machine-readable storage medium and utilizing a graphical user interface, a content analysis control panel;

receiving, via the machine, content data from an AI model or media source;

detecting, via one or more AI models implemented via the machine, detection data that includes first portions of the content data associated with a protected attribute and second portions of the content data associated with a predetermined metric;

generating, via the machine, analysis data associated with the protected attribute and the predetermined metric; and facilitating display, via the content analysis control panel, the analysis data associated with the protected attribute and the predetermined metric.

It should be noted that while the learning and collaboration subsystem 811, the platform access subsystem 813, subscription and billing subsystem 815, the privacy management system 817 and the database 819, the dataset development tools 802, AutoML tools 804, control panel generation tools 806, AI analysis tools/widgets 808, ML management tools 810 and the version control repository 812 are shown as being internal to the AI development platform 800, in other examples, any subset of the various elements of AI development platform 800 can be implemented external to the AI development platform 800 and coupled to the other components via the network 115. Furthermore, the AI development platform 800 can be implemented in a cloud computing configuration with any or all of the various elements of AI development platform 800 implemented within the cloud.

Figure 1B:
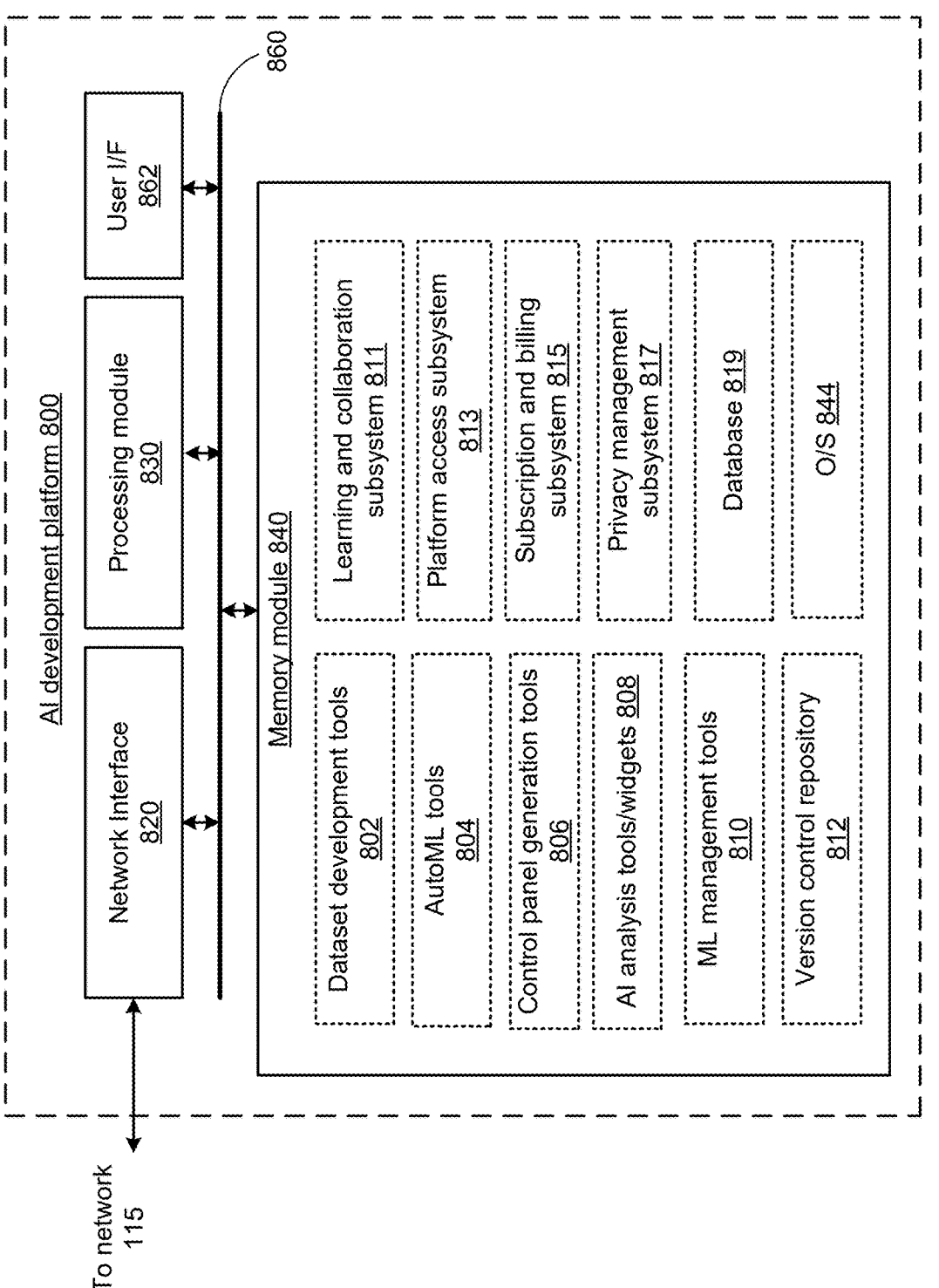
FIG. 1B presents a block diagram representation of an example artificial intelligence (AI) development platform.

FIG. 1B presents a block diagram representation of an AI development platform 800 in accordance with various embodiments. In particular, the AI development platform 800 includes a network interface 820 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The AI development platform 800 also includes a processing module 830 and memory module 840 that stores an operating system (O/S) 844 such as an Apple, Unix, Linux or Microsoft operating system or other operating system, the learning and collaboration subsystem 811, the platform access subsystem 813, subscription and billing subsystem 815, the privacy management system 817 and the database 819, the dataset development tools 802, AutoML tools 804, control panel generation tools 806, AI analysis tools/widgets 808, ML management tools 810 and the version control repository 812. In particular, the O/S 844, the learning and collaboration subsystem 811, the platform access subsystem 813, subscription and billing subsystem 815, the privacy management system 817 and the database 819, the dataset development tools 802, AutoML tools 804, control panel generation tools 806, AI analysis tools/widgets 808, ML management tools 810 and the version control repository 812 each include operational instructions that, when executed by the processing module 830, cooperate to configure the processing module 830 into a special purpose device to perform the particular functions of the AI development platform 800 described herein.

The AI development platform 800 may include a user interface (I/F) 862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the AI development platform 800 and that generate data in response to the user's interaction with AI development platform 800.

The processing module 830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 840. The memory module 840 can include a hard disc drive or other disc drive, read-only memory, random access memory, volatile memory, nonvolatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 860, other architectures are possible including additional data buses and/or direct connectivity between one or more elements. Further, the AI development platform 800 can include one or more additional elements that are not specifically shown.

Figure 1C:
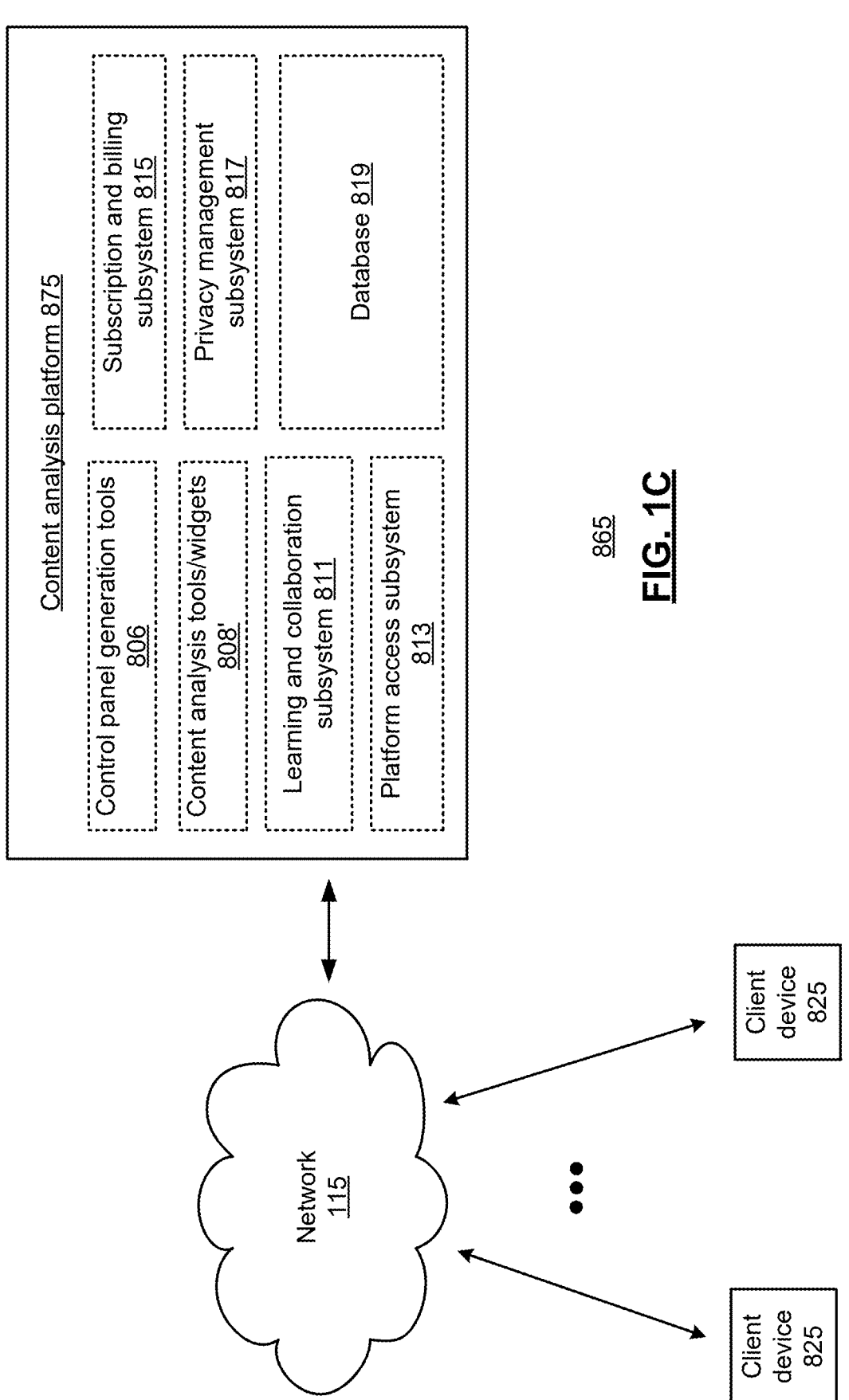
FIG. 1C presents a block diagram representation of an example system.
Figure 1D:
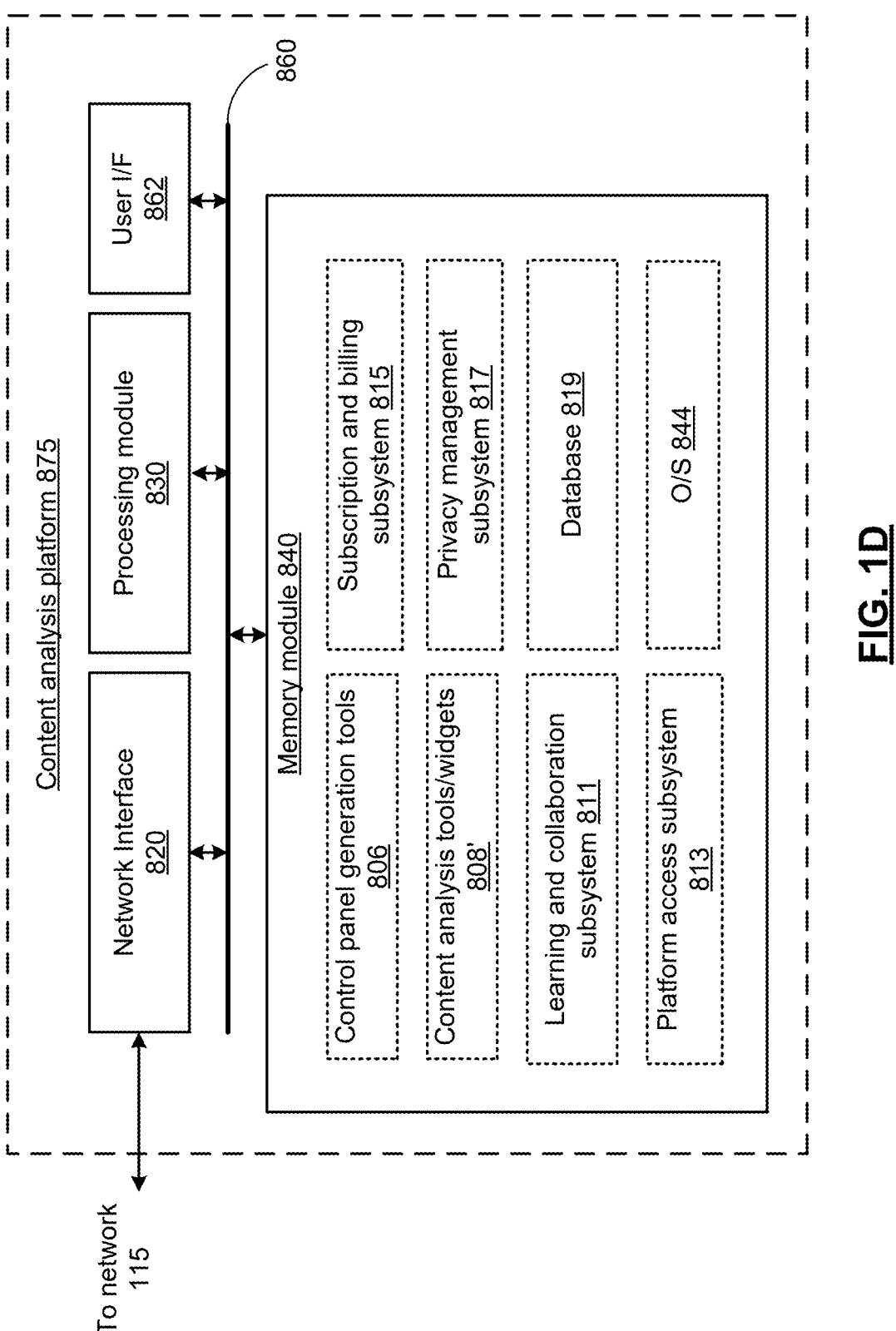
FIG. 1D presents a block diagram representation of an example content analysis platform.

FIG. 1C presents a block diagram representation of an example system. In particular a content analysis system 865 is shown that includes several elements of the AI development platform 800 that are referred to by common reference numerals. Similarly, FIG. 1D presents a block diagram representation of an example content analysis platform 875 is shown that includes several elements of the AI development platform 800 that are referred to by common reference numerals.

While the discussions of the AI development platform 800 have focused on the development and analysis of AI models, it should be noted than many of the elements of the AI development platform 800 also apply to the analysis of other media content that may or may not be AI related. The content analysis system 865, for example, includes content analysis tools/widgets 808' that includes the same or similar tools to the AI analysis tools/widgets 808, but that operate on media content or other content data, be it AI generated or not.

Figure 1E:
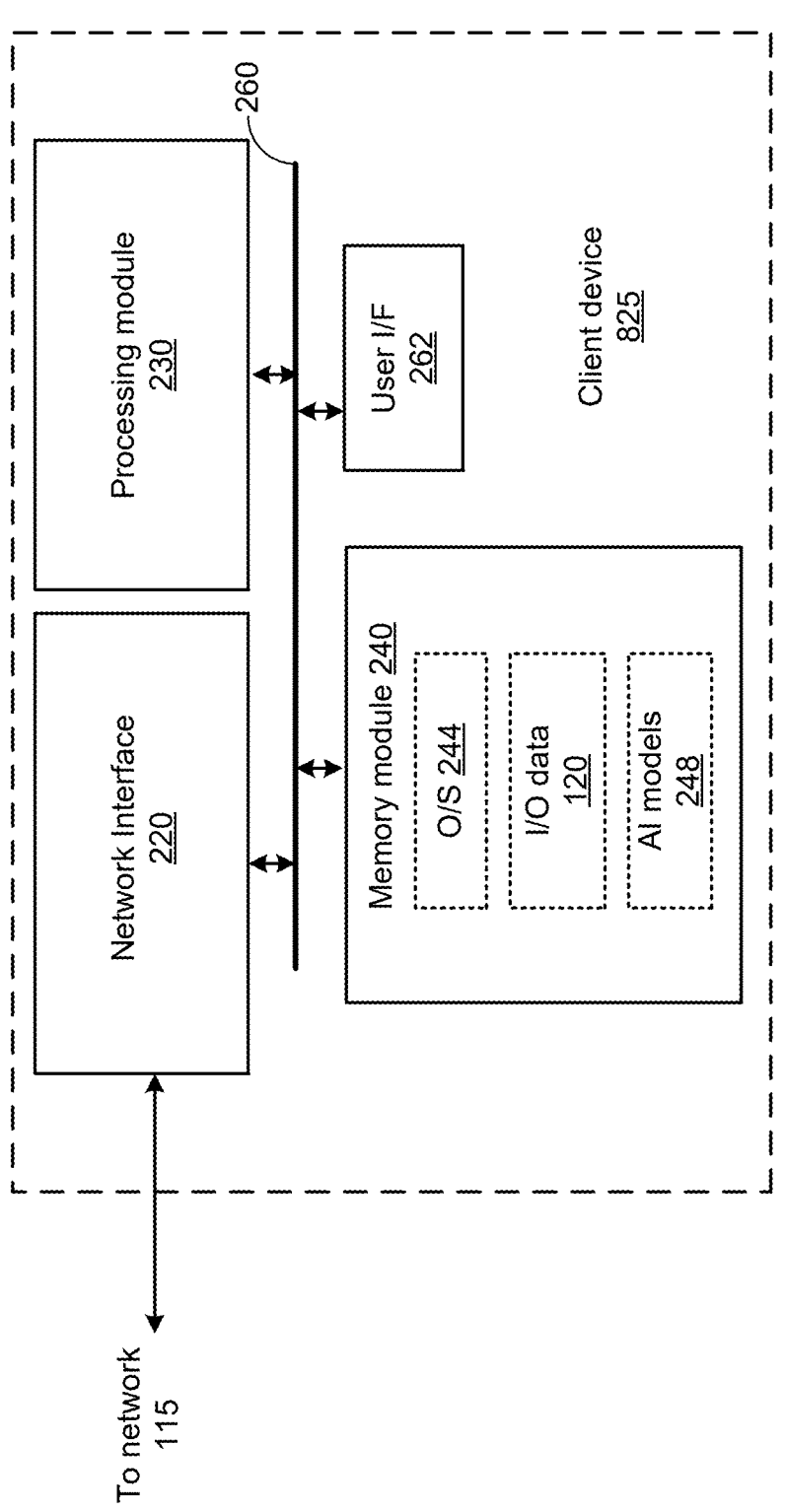
FIG. 1E presents a block diagram representation of an example client device.

FIG. 1E presents a block diagram representation of an example client device in accordance with various embodiments. In particular, a client device 825 is presented that includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The client device 825 also includes a processing module 230 and memory module 240 that stores an operating system (O/S) 244 such as an Apple, Unix, Linux or Microsoft operating system or other operating system, training data 120, and one or more gaming applications 248. In particular, the O/S 244 and gaming application 248 each include operational instructions that, when executed by the processing module 230, cooperate to configure the processing module into a special purpose device to perform the particular functions of the client device 825 described herein.

The client device 825 also includes a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the client device 825 and that generate data in response to the user's interaction with the client device 825.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the client device 825 can include one or more additional elements that are not specifically shown.

The client device 825 operates, via network interface 220, network 115 and AI development platform 800 and/or content analysis platform 875. In various embodiments, the client device 825 operates to display a graphical user interface, such as a content analysis control panel or other user interface. For example, the client device 825 displays a content analysis control panel based on content analysis control panel data generated by either the AI analysis platform 800 or the content analysis platform 875 and, in particular, the graphical user interface can display one or more screen displays based on data generated by the AI development platform 800 and/or content analysis platform 875. Furthermore, the graphical user interface can operate in response to interactions by a user to generate input data that is sent to the AI development platform 800 and/or content analysis platform 875 to control the operation of the AI development platform 800 and/or content analysis platform 875 and/or to provide other input.

FIG. 2A presents a flowchart representation of an example method in accordance with various embodiments. In particular, a method 600 is presented for use with any of the functions and features discussed in conjunction with FIGS. 1A-1E. Furthermore, a system comprising a network interface configured to communicate via a network, at least one processor and a non-transitory machine-readable storage medium can store operational instructions that, when executed by the at least one processor, cause the at least one processor to perform operations that any of the method steps described below.

Step 602 includes providing, via a system that includes a processor and a network interface, an AI development platform that includes: a platform access subsystem that provides secure access to the AI development platform to a plurality of client devices via the network interface; a learning and collaboration subsystem that provides a network-based forum that facilitates a collaborative development of machine learning tools via the plurality of client devices and that provides access to a library of AI tutorials and a database of AI news; a subscription and billing subsystem that controls access to the AI development platform via each of the plurality of client devices in conjunction with subscription information associated with each of the plurality of client devices and further; that generates billing information associated with each of the plurality of client devices in accordance with the subscription information; and a privacy management system that protects the privacy of machine learning development data associated with each of the plurality of client devices.

Step 604 includes facilitating, via the AI development platform, the development of a training dataset associated with at least one of the plurality of client devices. Step 606 includes providing, via the AI development platform, access to a plurality of auto machine learning tools to facilitate the development of an AI model. Step 608 includes providing, via the AI development platform, access to a plurality of AI analysis widgets to facilitate the evaluation of the AI model, wherein the plurality of AI analysis widgets include a plurality of virtue scoring models that predict virtue scores for the AI model associated with the plurality of virtues. Step 610 includes providing, via the AI development platform, access to a version control repository for storing a plurality of versions of the training dataset and the AI model.

FIG. 2B presents a flowchart representation of an example method in accordance with various embodiments. In particular, a method 620 is presented for use with any of the functions and features discussed in conjunction with FIGS. 1A-1E and/or the method of FIG. 2A. Furthermore, a system comprising a network interface configured to communicate via a network, at least one processor and a non-transitory machine-readable storage medium can store operational instructions that, when executed by the at least one processor, cause the at least one processor to perform operations that any of the method steps described below.

Step 622 includes generating, via a machine that includes at least one processor and a non-transitory machine-readable storage medium and utilizing a graphical user interface, a content analysis control panel. Step 624 includes receiving, via the machine, customization data that indicates a plurality of virtue scoring models, and presentation parameters associated with the plurality of scoring models.

Step 626 includes receiving, via the machine, content data. Step 628 includes generating, via the machine, predicted virtue score data associated with the content data for each of the plurality of virtue scoring models. Step 630 includes facilitating display, via the content analysis control panel and in accordance with the customization data, the predicted virtue score data associated with the content data for each of the plurality of virtue scoring models.

In addition or in the alternative, the plurality of virtue scoring models include a plurality of artificial intelligence (AI) models that are each trained based on survey data to generate portions of the predicted virtue score data indicating a corresponding one of a plurality of scores.

In addition or in the alternative, the plurality of AI models includes a responsibility model and the plurality of scores includes a responsibility score that is based on an amount the content data addresses legal or ethical principles.

In addition or in the alternative, the plurality of AI models includes an equitability model and the plurality of scores includes an equitability score that is based on an amount of bias in the content data.

In addition or in the alternative, the plurality of AI models includes a reliability model and the plurality of scores includes a reliability score that indicates variations in others of the plurality of scores.

In addition or in the alternative, the plurality of AI models includes an explainability model and the plurality of scores includes an explainability score associated with the content data.

In addition or in the alternative, the plurality of AI models includes a morality model and the plurality of scores includes a morality score associated with the content data.

In addition or in the alternative, the method can further include generating improvement data associated with at least one of the plurality of scores.

In addition or in the alternative, the content data is an Artificial Intelligence (AI) model.

In addition or in the alternative, the presentation parameters includes a customized selection of at least one of: at least one statistic, at least one chart, or at least one graph.

In addition or in the alternative, the method can further include displaying, via the content analysis control panel and in accordance with the customization data, of at least one of: at least one protected attribute, or at least one key performance indicator.

In addition or in the alternative, the method can further include facilitating selection of the content data from at least one of: an AI model, or a content source.

In addition or in the alternative, the method can further include generating, based on user input, survey data corresponding to a survey; collecting survey results data in response to the survey; and facilitating generation of a custom virtue scoring model of the plurality of virtue scoring models.

Figure 2C:
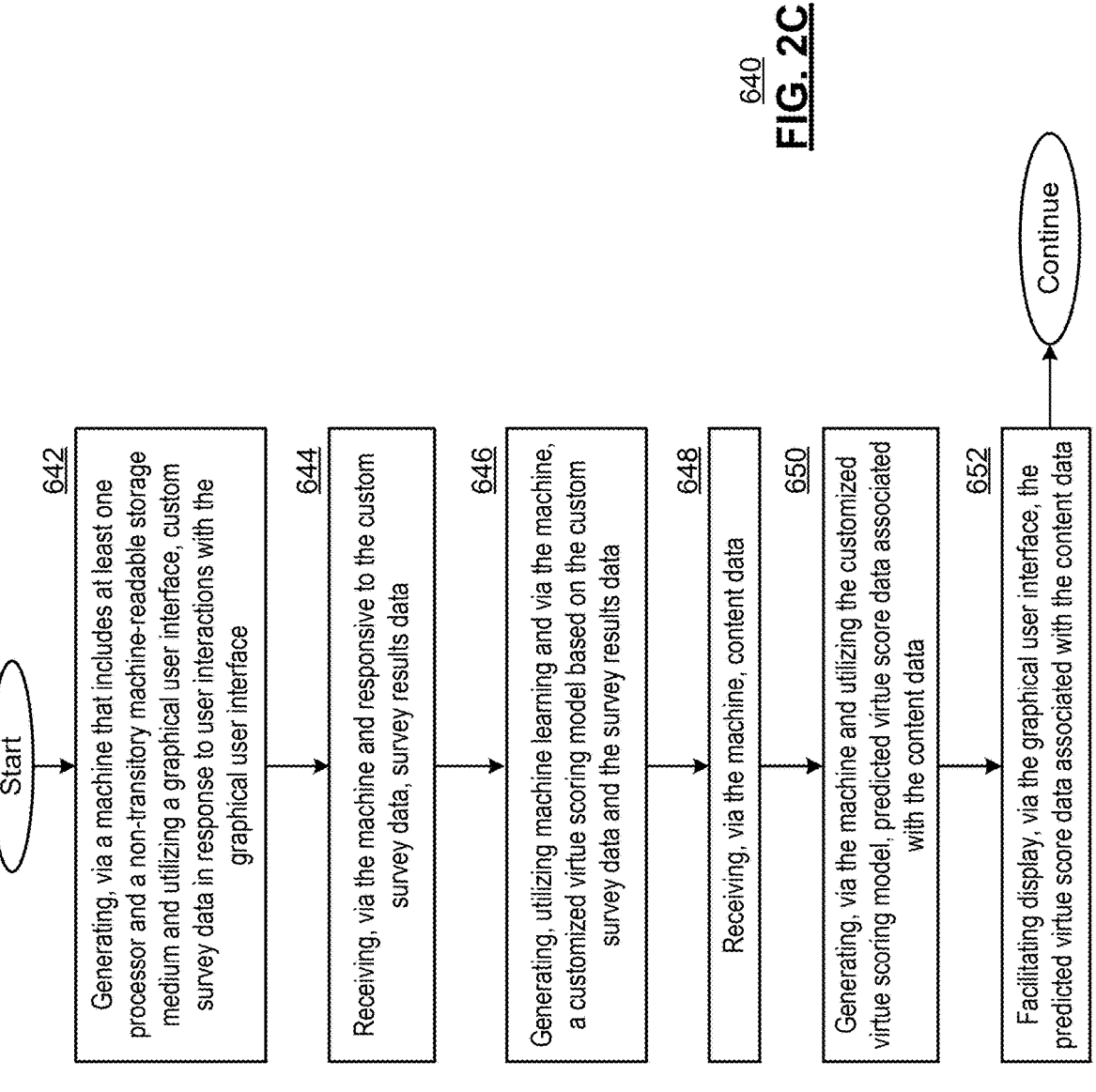
FIG. 2C presents a flowchart representation of an example method.

FIG. 2C presents a flowchart representation of an example method in accordance with various embodiments. In particular, a method 640 is presented for use with any of the functions and features discussed in conjunction with FIGS. 1A-1E and/or the methods of FIGS. 2A and/or 2B. Furthermore, a system comprising a network interface configured to communicate via a network, at least one processor and a non-transitory machine-readable storage medium can store operational instructions that, when executed by the at least one processor, cause the at least one processor to perform operations that any of the method steps described below.

Step 642 includes generating, via a machine that includes at least one processor and a non-transitory machine-readable storage medium and utilizing a graphical user interface, custom survey data in response to user interactions with the graphical user interface. Step 644 includes receiving, via the machine and responsive to the custom survey data, survey results data.

Step 646 includes generating, utilizing machine learning and via the machine, a customized virtue scoring model based on the custom survey data and the survey results data. Step 648 includes receiving, via the machine, content data. Step 650 includes generating, via the machine and utilizing the customized virtue scoring model, predicted virtue score data associated with the content data. Step 652 includes facilitating display, via the graphical user interface, the predicted virtue score data associated with the content data.

In addition or in the alternative, the customized virtue scoring model includes an artificial intelligence (AI) model that is trained based on at least one of: the custom survey data or the survey results data.

In addition or in the alternative, the AI model includes a responsibility model and the predicted virtue score data indicates a responsibility score that is based on an amount the content data addresses legal or ethical principles.

In addition or in the alternative, the AI model includes an equitability model and the predicted virtue score data indicates an equitability score that is based on an amount of bias in the content data.

In addition or in the alternative, the AI model includes a reliability model and the predicted virtue score data indicates a reliability score that indicates variations in an others virtue scores.

In addition or in the alternative, the AI model includes an explainability model and the predicted virtue score data indicates an explainability score associated with the content data.

In addition or in the alternative, the AI model includes a morality model and the predicted virtue score data indicates a morality score associated with the content data.

In addition or in the alternative, the method further includes generating improvement data associated with and the predicted virtue score data.

In addition or in the alternative, the content data is an Artificial Intelligence (AI) model.

In addition or in the alternative, the method further includes facilitating selection of the content data from at least one of: an AI model, or a content source.

In addition or in the alternative, the customized virtue scoring model includes an artificial intelligence (AI) model and wherein generating the customized virtue scoring model includes providing access to a plurality of AI analysis widgets to facilitate an evaluation of the AI model.

In addition or in the alternative, the plurality of AI analysis widgets include a plurality of virtue scoring models that predict virtue scores for the AI model associated with a plurality of virtues.

In addition or in the alternative, the customized virtue scoring model includes an artificial intelligence (AI) model and wherein the method further comprises providing access to a version control repository for storing a plurality of versions of a training dataset and a plurality of version of the AI model.

Figure 2D:
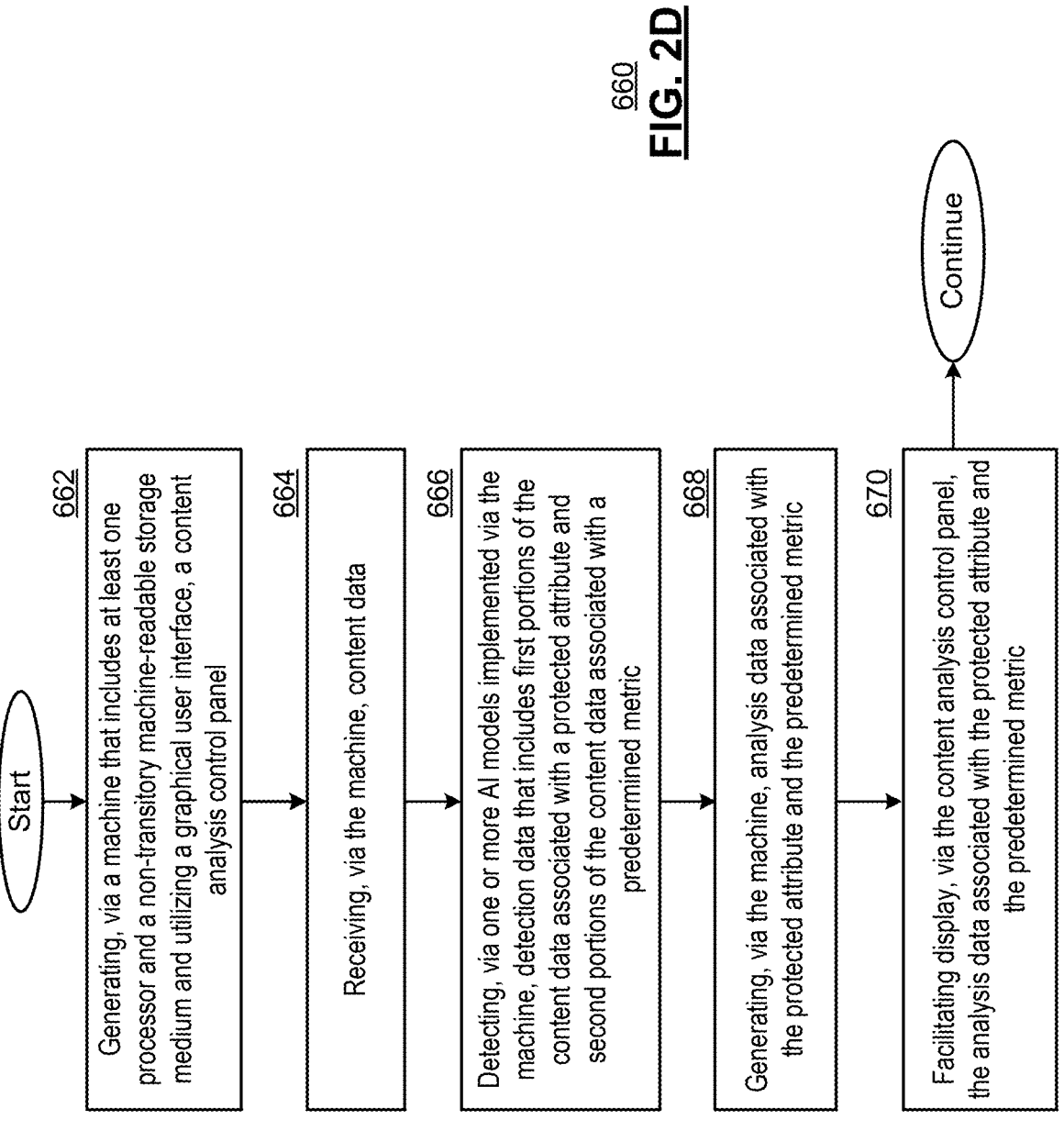
FIG. 2D presents a flowchart representation of an example method.

FIG. 2D presents a flowchart representation of an example method in accordance with various embodiments. In particular, a method 660 is presented for use with any of the functions and features discussed in conjunction with FIGS. 1A-1E and/or the methods of FIGS. 2A, 2B and/or 2C. Furthermore, a system comprising a network interface configured to communicate via a network, at least one processor and a non-transitory machine-readable storage medium can store operational instructions that, when executed by the at least one processor, cause the at least one processor to perform operations that any of the method steps described below.

Step 662 includes generating, via a machine that includes at least one processor and a non-transitory machine-readable storage medium and utilizing a graphical user interface, a content analysis control panel. Step 664 includes receiving, via the machine, content data.

Step 666 includes detecting, via one or more AI models implemented via the machine, detection data that includes first portions of the content data associated with a protected attribute and second portions of the content data associated with a predetermined metric. Step 668 includes generating, via the machine, analysis data associated with the protected attribute and the predetermined metric. Step 670 includes facilitating display, via the content analysis control panel, the analysis data associated with the protected attribute and the predetermined metric.

In addition or in the alternative, the protected attribute is a potential source of discrimination.

In addition or in the alternative, the potential source of discrimination is at least one of: gender, race, age, religion, ethnicity, sexual preference, or disability.

In addition or in the alternative, the predetermined metric is a key performance indicator that varies based on the potential source of discrimination.

In addition or in the alternative, the predetermined metric is a term that varies based on the potential source of discrimination.

In addition or in the alternative, the predetermined metric indicates at least one grade point average.

In addition or in the alternative, the predetermined metric indicates at least one salary.

In addition or in the alternative, the predetermined metric indicates at least one job offers.

In addition or in the alternative, the predetermined metric indicates at least one loan approval or disapproval.

In addition or in the alternative, the predetermined metric indicates at least one credit score.

In addition or in the alternative, the predetermined metric indicates at least one job promotion.

In addition or in the alternative, the predetermined metric indicates at least one arrest.

Figures 3A, 3B, 3C, 3D:
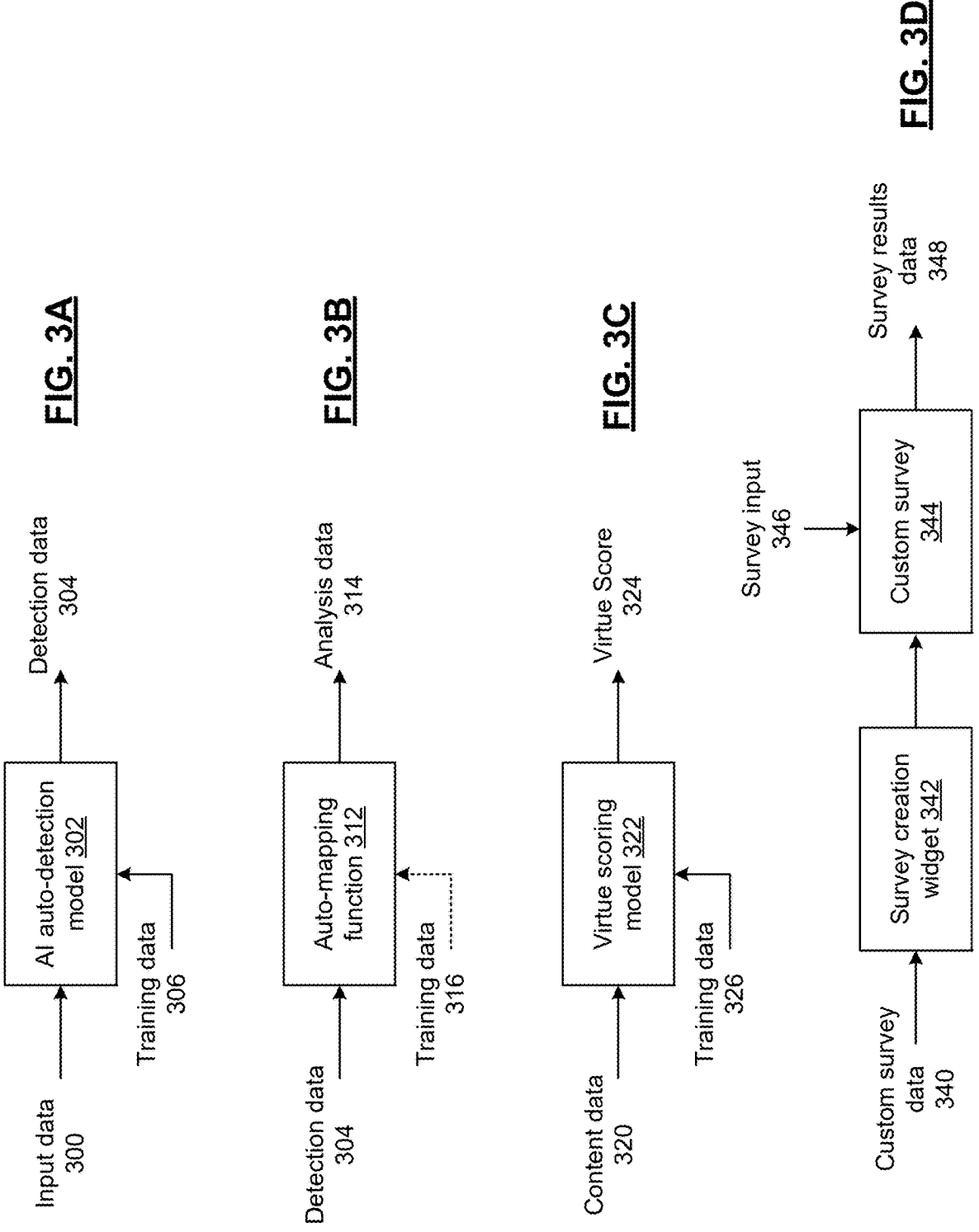
FIG. 3A presents a block diagram representation of an example AI auto detection model.
FIG. 3B presents a block diagram representation of an example auto-mapping function.
FIG. 3C presents a block diagram representation of an example virtue scoring model.
FIG. 3D presents a block diagram representation of an example survey creation widget.

FIG. 3A presents a block diagram representation of an example AI auto-detection model. In particular, an AI auto-detection model 302 is shown that is an example of an AI analysis tool/widget 808 and/or a content analysis tool/widget 808'. AI auto-detection model 302 is trained via training data 306 to recognize portions of input data 300 that contain or are predicted to contain, one or more protected attributes or other metrics. In various examples, the input data 300 can be AI input/output data of an underlying AI process to be analyzed and/or content data from other media content from a media source to be analyzed.

In various examples, the protected attributes can include terms related to gender, sex, race, age, religion, ethnicity, sexual preference, disabilities or other terms associated with potential sources of discrimination. The metrics can, for example, include one or more terms, key performance indicators (KPIs) or other factors that could be present in the input data 300 and be vary based on such sources of discrimination. Examples of such metrics include grade point average, salary, job offers, loan approvals or disapprovals, credit scores, promotions, arrests, etc. depending on the type of data being analyzed.

In various examples, the AI auto-detection model 302 uses deep layered natural language processing or other AI that is trained based on training data 306 that contains these terms, region variations, common or expected misspellings of these terms, alternative terms, etc. In operation, the AI auto-detection model 302 generates detection data 304, such as columnar or tabular data containing labels that indicate the terms identified in the input data 300. While the AI auto-detection model 302 is shown as a single model, the AI auto-detection model 302 may contain a plurality of individual AI models, for example, each trained to recognize one corresponding term to be detected.

FIG. 3B presents a block diagram representation of an example auto-mapping function. In particular, an auto-mapping function 312 is shown that is a further example of an AI analysis tool/widget 808 and/or a content analysis tool/widget 808'.

In various embodiments, the auto-mapping function 312 operates on the detection data 304 and applies a continuous distribution, categorical distribution, binned distribution or other statistical analysis to generate analysis data indicating statistics and/or other values regarding protected attributes and metrics. Illustrative examples, include:

race=36% white/Asian, 64% other races
Age=23% over 65
GPA=3.213+/−0.53
LSAT score=32+/−7
Etc.

The auto-mapping function 312 can be implemented via one or more parametric or non-parametric statistical functions. In other examples, the auto-mapping function 312 can be implemented via AI techniques and optionally be trained based on training data 316 to generate the analysis data 314. While the auto-mapping function 312 is shown as a single function, the auto-mapping function 312 may contain a plurality of individual functions, for example, each operable to generate statistics or other analysis data 314 for a corresponding term or set of terms indicated by the detection data 304.

FIG. 3C presents a block diagram representation of an example virtue scoring model. In particular, a virtue scoring model 322 is shown that is a further example of an AI analysis tool/widget 808 and/or a content analysis tool/widget 808'. In operation, the virtue scoring model 322 is trained, for example, via training data 326 to generate a virtue score 324 corresponding to a particular virtue in response to content data 320 such as analysis data 314, AI output data of an underlying AI process to be analyzed and/or content data from other media content from a media source to be analyzed. While the virtue scoring model 322 is shown as a single model, the virtue scoring model 322 may contain a plurality of individual models, each corresponding to a different standard or customized virtue score 324.

Examples of the virtue scoring model(s) 322 include:

A responsibility scoring model trained to generate a virtue score 324 indicating a responsibility score or other metric that indicates, for example, how well underlying AI or other content is addressing legal and/or ethical principles;

An equitability scoring model trained to generate a virtue score 324 indicating an equitability score or other metric, that indicates, for example, an amount (or lack of) bias in the underlying AI or other content data;

A reliability scoring model or other function that generates a virtue score 324 indicating that identifies variations or drift in other virtue scores 324 or other changes in AI input or output data from the training set that can. For example, indicate the need to retrain the underlying AI or investigate the cause of changes in scores in content data;

An explainability scoring model trained to generate a virtue score 324 indicating an explainability score or other metric indicating, for example, how transparent an underlying AI process is;

One or more sub-models relating to portions of the results above, that for example, can be used to construct overall virtue scores 324; and One or more user customized virtues, trained for example, based on results from user defined surveys to generate other virtue scores 324 that are different than those listed above and address a particular user problem or concern.

FIG. 3D presents a block/flow diagram representation of an example survey creation process. As previously discussed, the AI development platform 800 and content analysis platform 875 are operable to generate customized virtue scoring models that are trained or otherwise generated based on custom survey data and the survey results data. In the example, a survey creation widget 342 that is a further example of an AI analysis tool/widget 808 and/or a content analysis tool/widget 808' is used to create a custom survey 344 based on custom survey data 340 input by the user via, for example, the content analysis control panel. The survey results data 348 are generated based on survey input 346 from survey participants.

While the custom survey 344 is shown as a single survey, the survey creation widget 342 can be used to generate multiple custom surveys for multiple custom virtue scoring models. Furthermore, survey data results 348 and custom survey data 340 generated in this fashion can also be used to train any of the standard virtue scoring models discussed above.

Figure 3E:
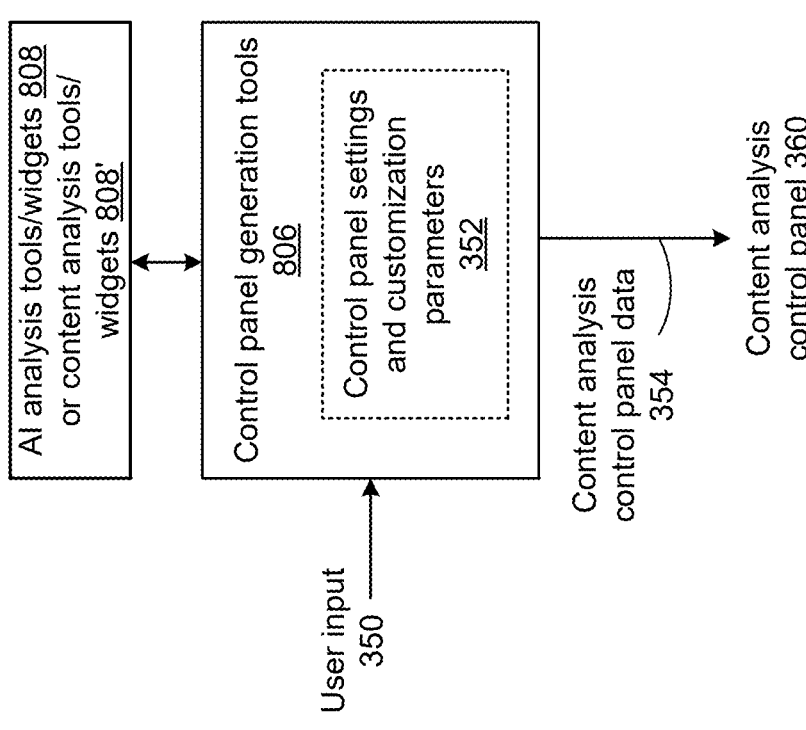
FIG. 3E presents a block diagram representation of an example of control panel generation tools.
Figure 3F:
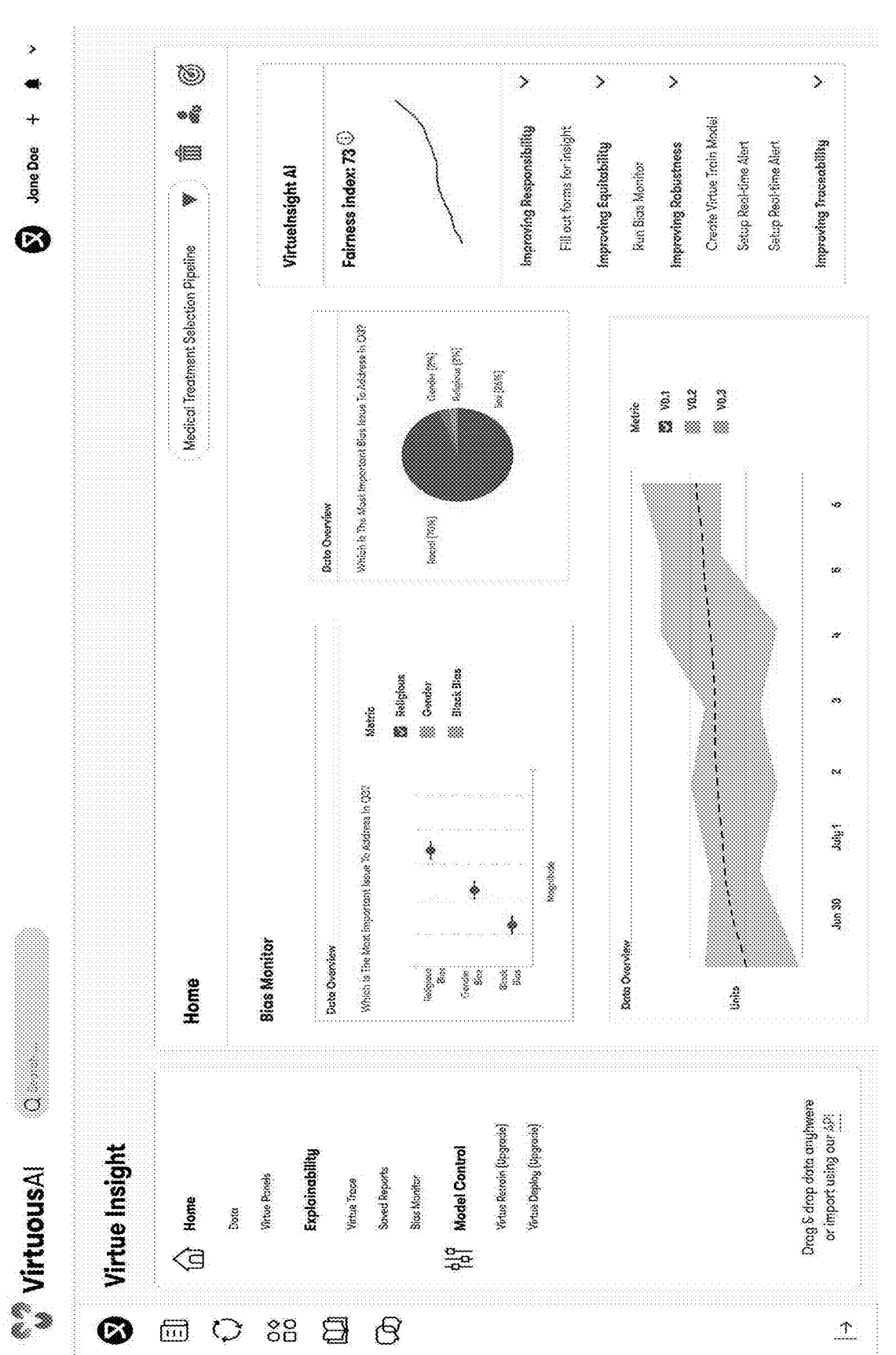
FIG. 3F presents a pictorial representation of an example of a content analysis control panel.

FIG. 3E presents a pictorial/block diagram representation of an example of control panel generation tools 806. In the example shown control panel generation tools store control panel setting and customization parameters 352 that are generated via interaction the user and user input 350. In operation, the control panel generation tools 806 generate content analysis control panel data 354, based on further user input 350 and the AI analysis tools/widgets 808 or content analysis tools/widgets 808'. This content analysis control panel data 354 is formatted for display via a display device of a client device, such as client device 825 to reproduce the content analysis control panel 360. An example screen display is shown in FIG. 3F.

As previously discussed, the content analysis control panel 360 generated via the set of control panel generation tools 806 operates in conjunction with the AI analysis tools/widgets 808 to provide a graphical user interface that aids the user by gathering and presenting AI data and/or other content for analysis, the creation of custom virtue scoring models, the selection of particular virtue scoring models (either custom or preset) to be used, and the presentation of virtue scores and other analysis results. For example, the content analysis control panel 360 operates via the control panel generation tools 806 and associated AI analysis tools/widgets 808 to:

guide the user through customization of control panel settings and customization parameters 352 used to generate the content analysis control panel 360;

facilitate the selection of data sets from an AI model or content source in addition to the selection of protected attributes, key performance indicators and/or other metrics;

identify, map and present data associated with the protected attributes, key performance indicators and/or other metrics including a customized selection of statistics, charts, graphs and/or other visualizations;

facilitate the generation of survey data and collection of survey results data to facilitate the generation of custom and/or standard virtue scoring models;

generate and present virtue scores associated with a selected group of virtue scoring models including a customized selection of statistics, charts, graphs and/or other visualizations of each score; and generate and present suggested improvements to any of the virtue scores associated with a selected group of virtue scoring models.

Figure 4A:
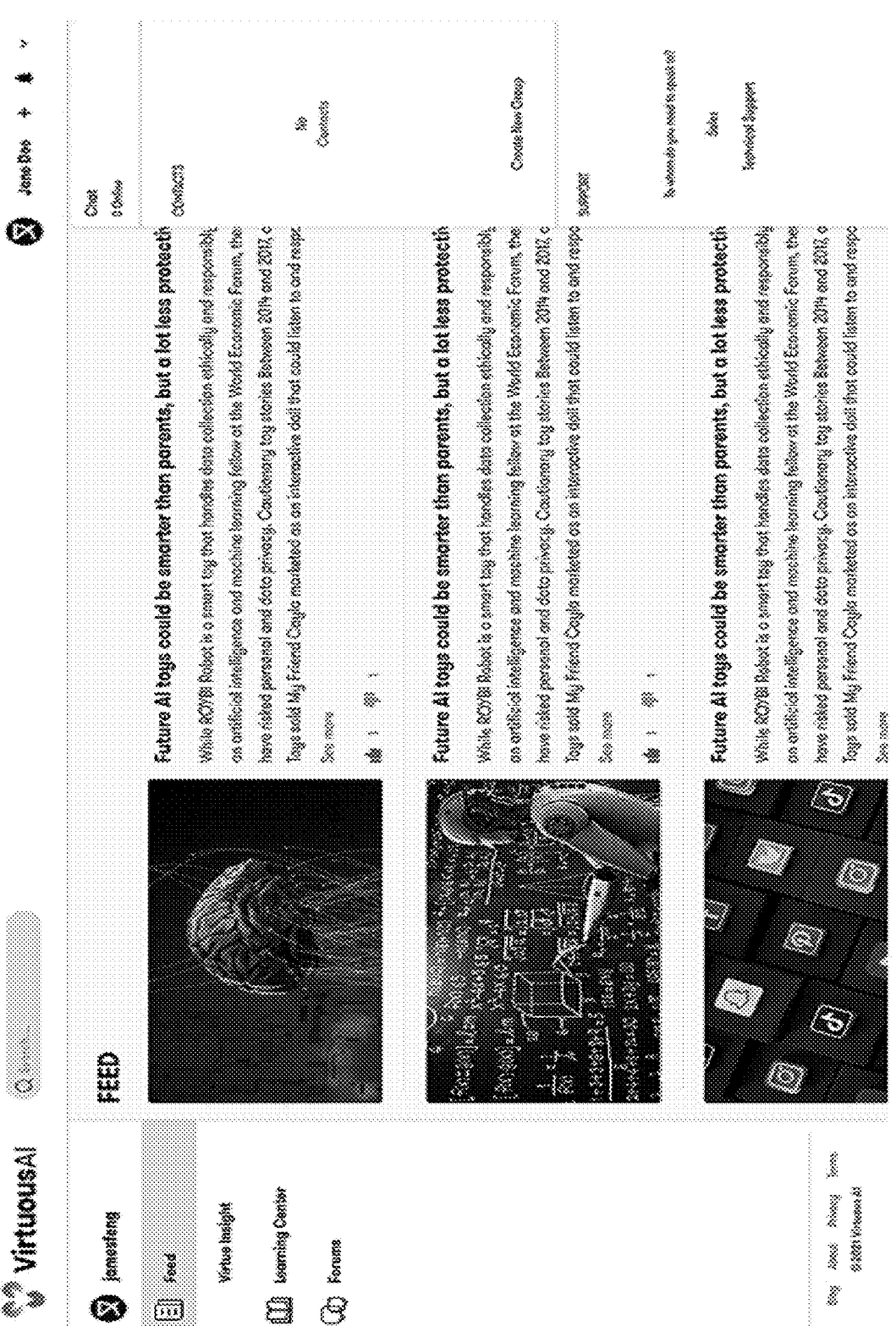
FIGS. 4A-4Y present graphical diagram representations of example screen displays or portions thereof.
Figure 4B:
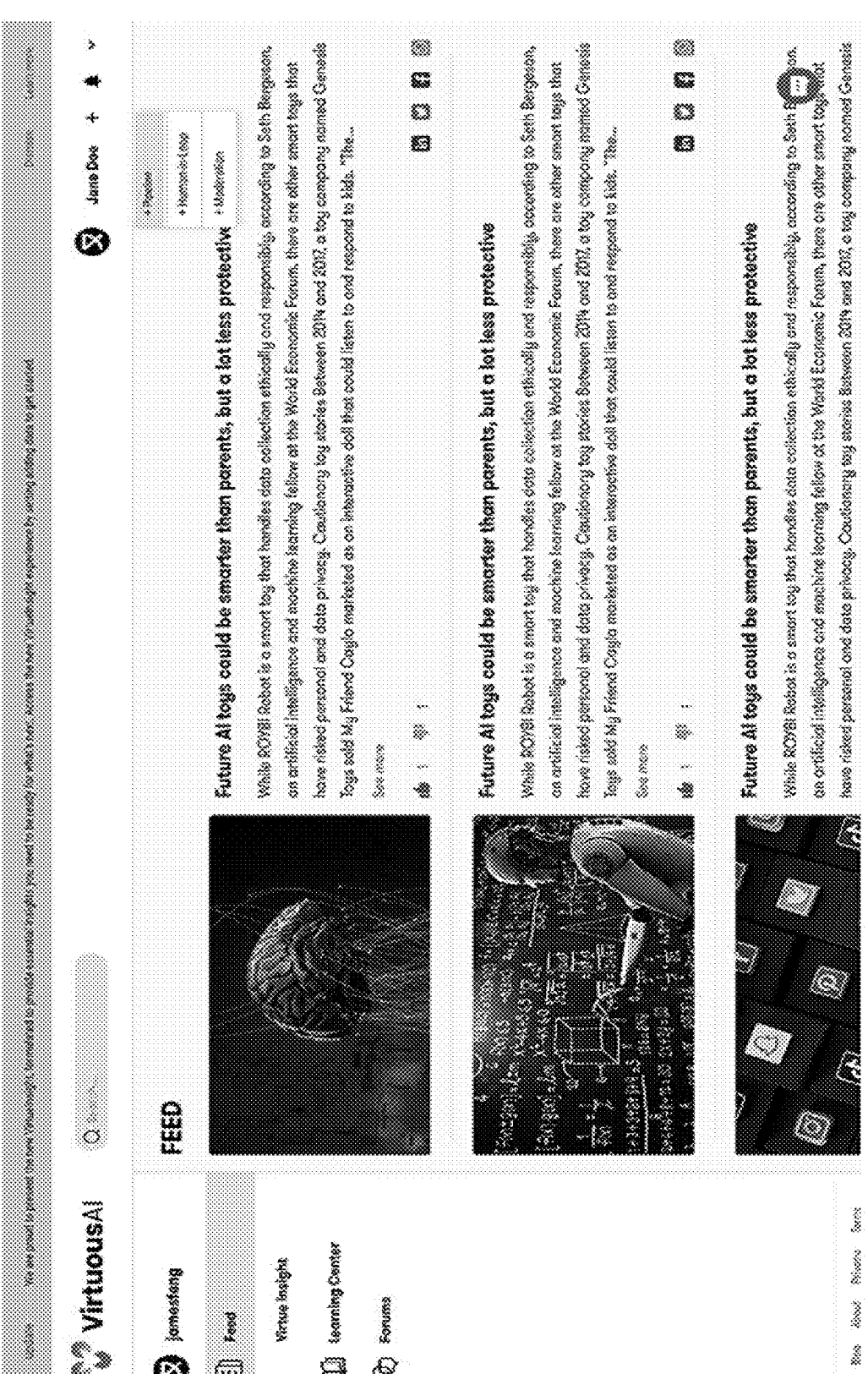
Figure 4C:
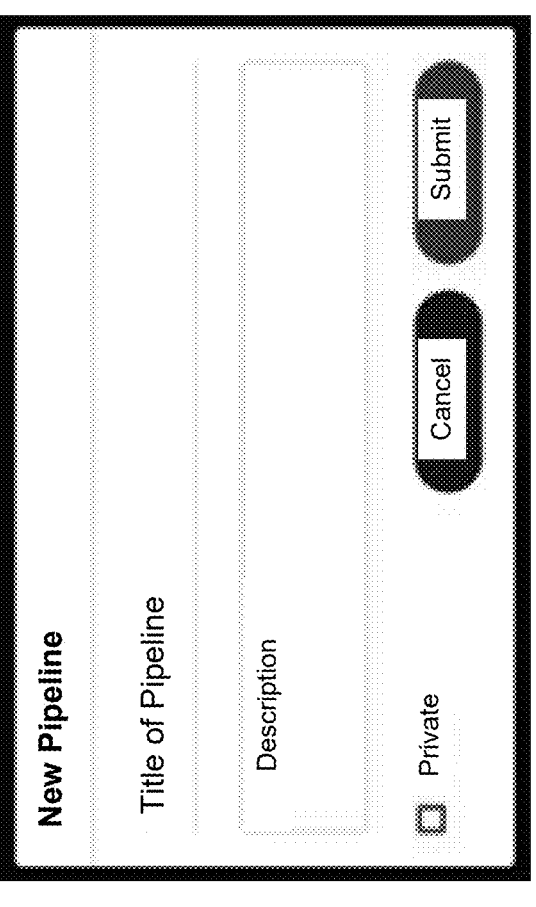
Figure 4D:
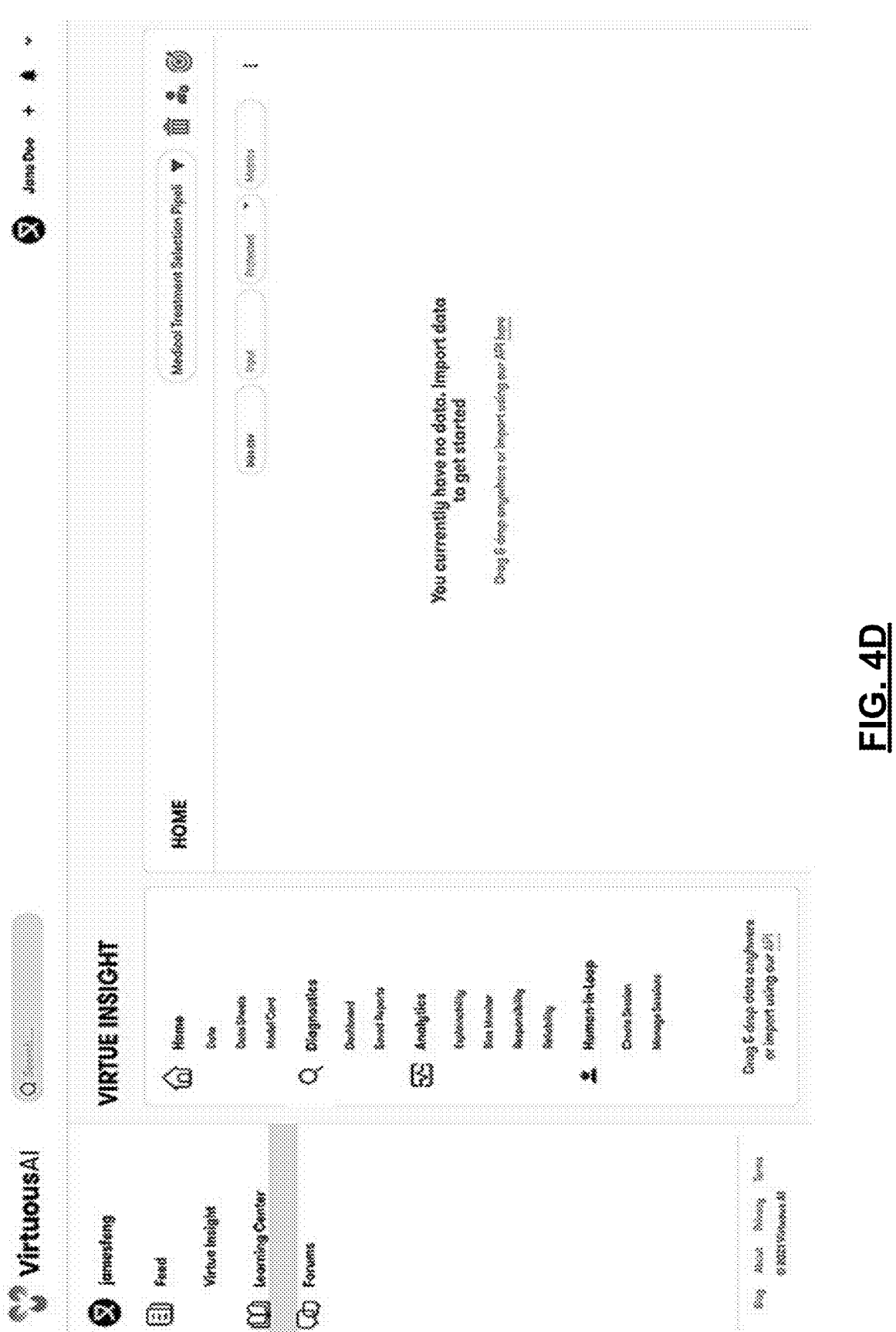

FIGS. 4A-4V and 5A-5E present graphical diagram representations of example screen displays or portions thereof corresponding to a content analysis control panel. In particular, FIG. 4A presents a screen display of a content analysis control panel (CACP) of a User "Jane Doe". The CACP includes a news feed that shows various AI related articles that can be individually accessed and read by the user. In FIG. 4B, the user has accessed a drop-down menu and chosen to create a new AI pipeline. In FIG. 4C, a popup window is shown that allows the user to input a title and description of the new pipeline. In, FIG. 4D, the CACP is shown after the user has chosen to name the new pipeline, "medical treatment selection pipeline". The screen display indicates that there is currently no data for the pipeline and prompts to user to import data in order to get started. In particular, the user has the option of dragging a dropping a data set into the window or using an API of the system.

Figure 4E:
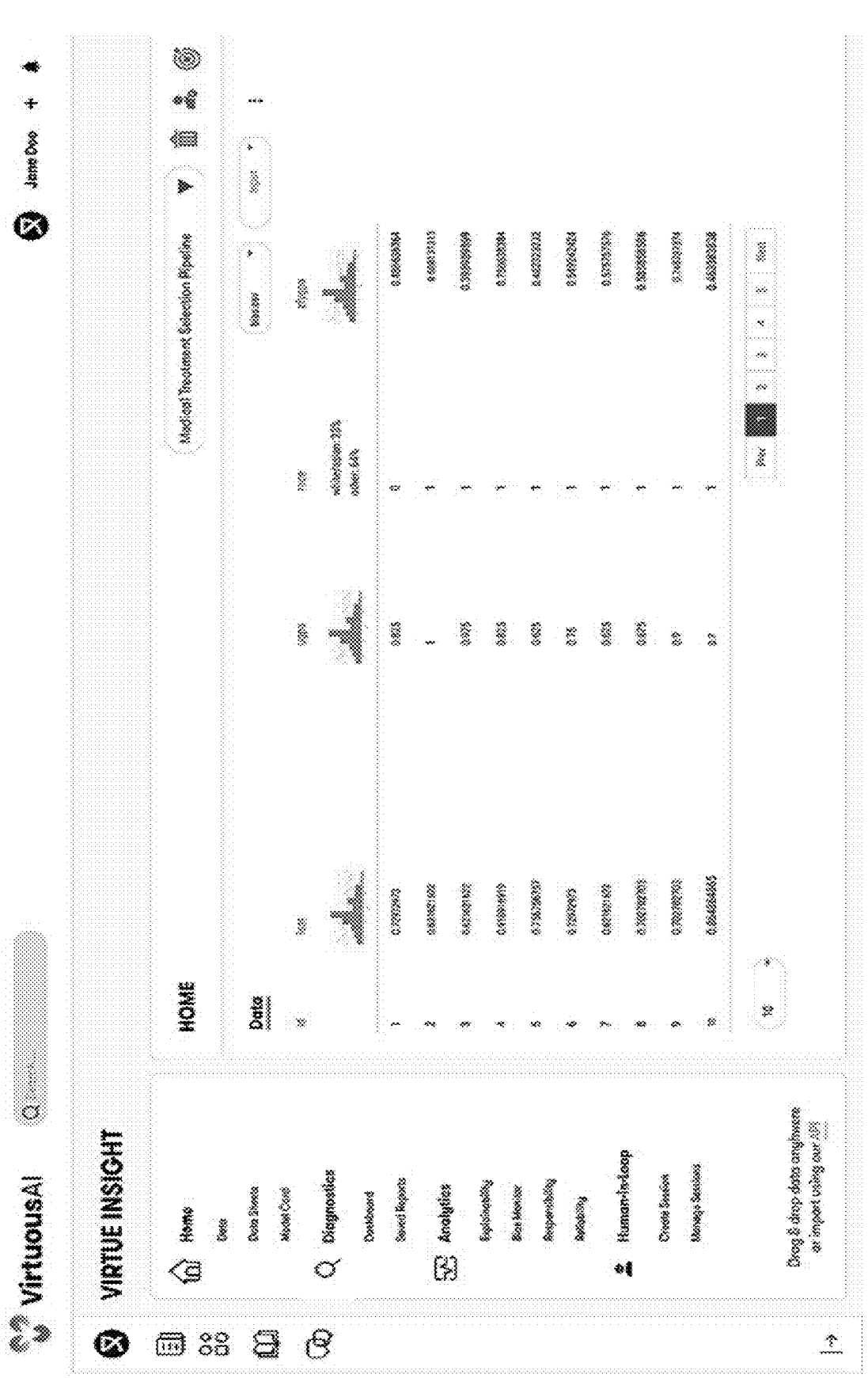
Figure 4F:
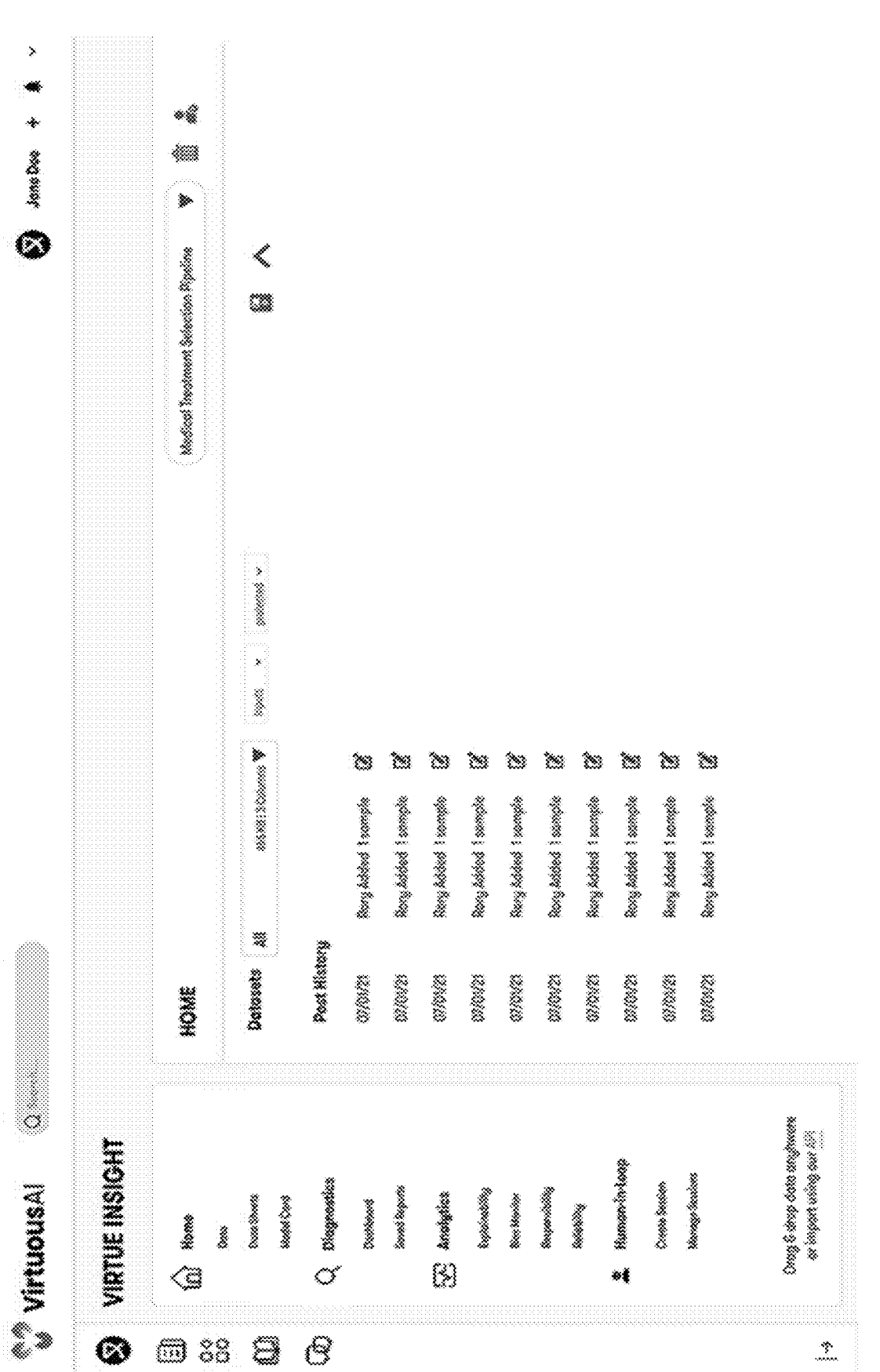

In FIG. 4E, the user has imported a dataset and auto-detection and auto-mapping have been performed by the AI analysis widgets/tools 808 to categorize the metrics "last", "ugpa" and "zfgpa" by race, either "white/Asian" or "other". Input data sets can, for example, be in columnar format with columns representing different datatypes. Input data sets can be static, continuous updated and/or updated, periodically (e.g. once a day, once a week, once a month, etc.). In FIG. 4F, the user has elected to view a history of datasets that have been entered, their respective dates and who they were added by ("Rory", in this case).

Figure 4G:
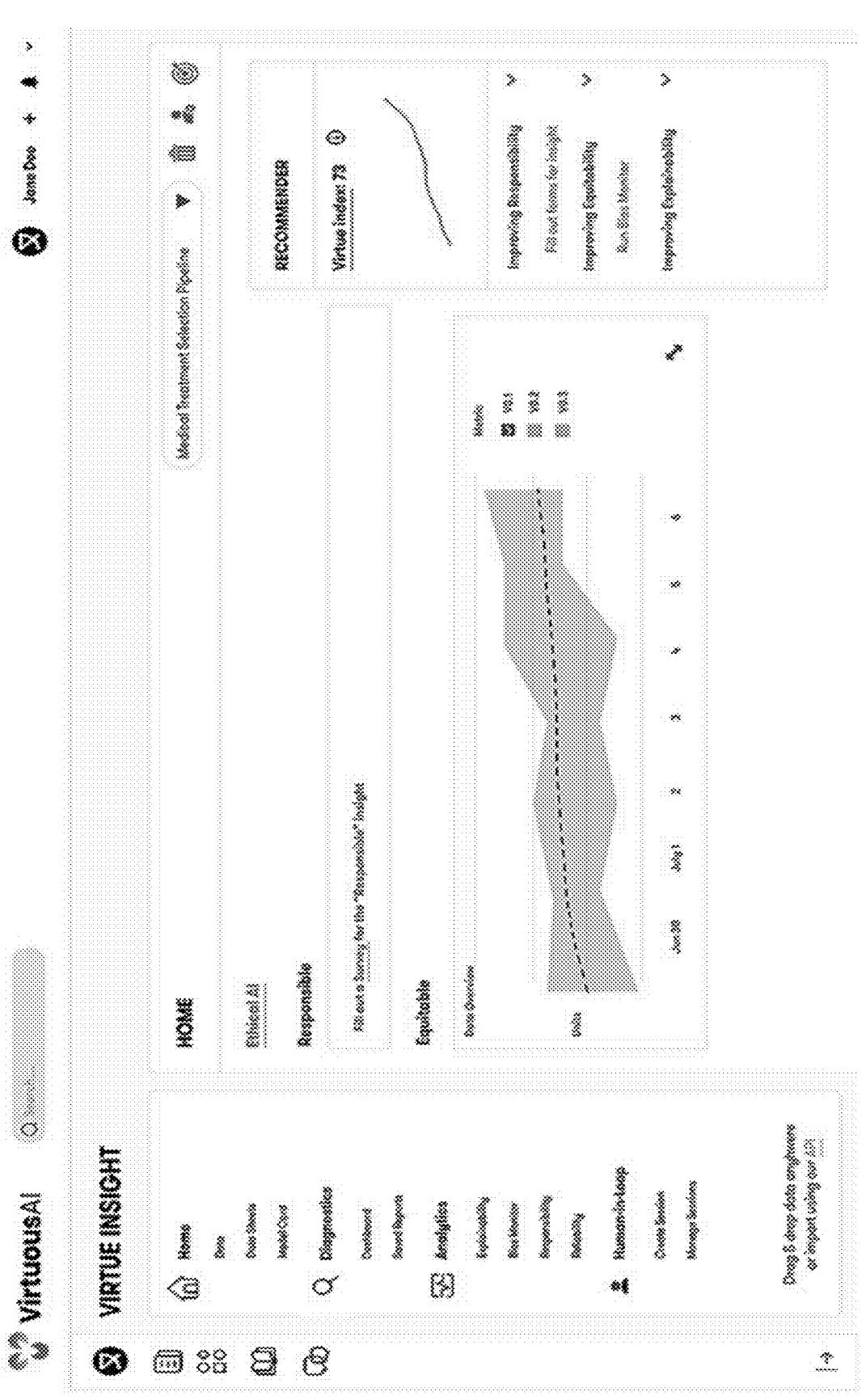

In FIG. 4G, the user has customized the CACP by entering customization data to select and generate two particular virtue scoring models for the selected pipeline, a responsible/responsibility scoring model and a equitable/equitability scoring model.

Furthermore, the user has selected presentation parameters, either default or customized for each scoring model to indicate how the virtue scores will be displayed, for example, by particular graphs, charts, or other graphics or visual indications. In this case, the CACP prompts the user to fill out a survey in order to train the responsibility scoring model. Equitability scores are presented in a window below in the chosen presentation format along with an overall fairness index in the upper right portion of the screen. This fairness index can be generated based on a function/combination of the user-selected virtues or based on all virtues, depending on the implementation.

As shown in the panel on the right, robustness and traceability scoring models are also available as well as links to tools that assist the user in improving, responsibility, equitability, robustness and/or other standard virtues. As shown in the panel on the left, the user is given the options to retrain or deploy any of the selected virtue scoring models. Icons can also be provided allowing the user to seek human in the loop (HIL) feedback and/or to share results with private groups, public groups, social media, etc.

Figure 4H:
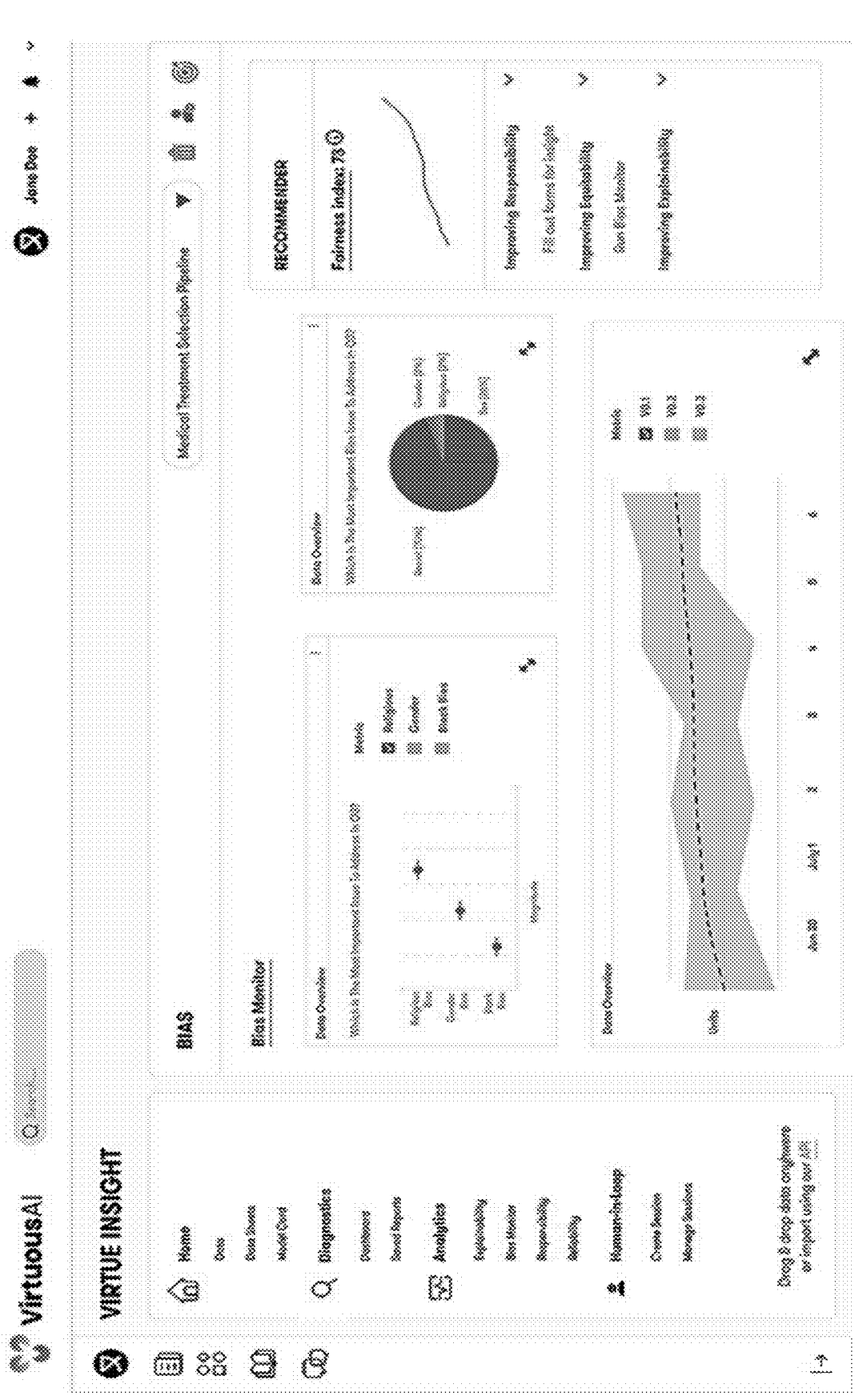
Figure 4I:
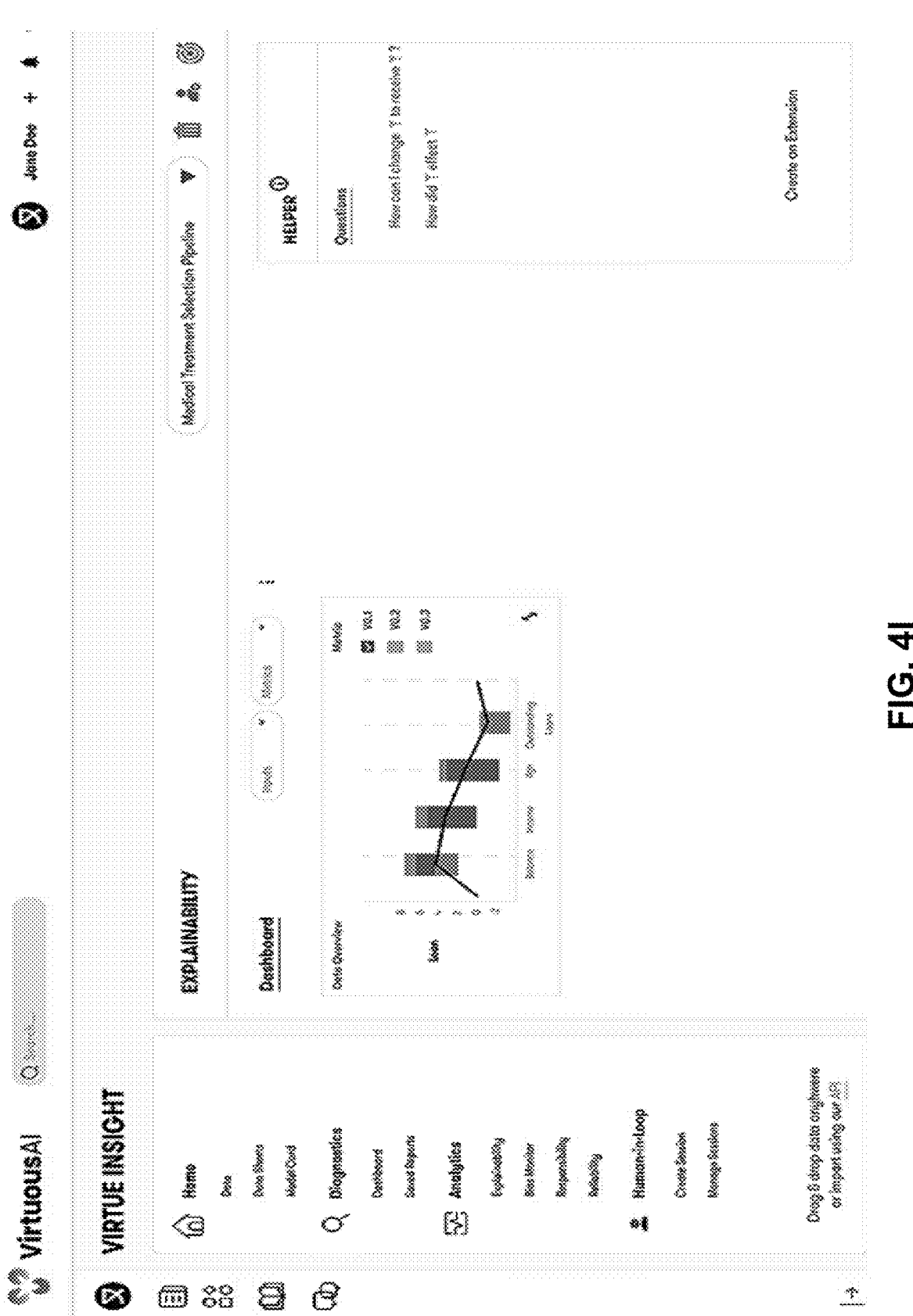
Figure 4J:
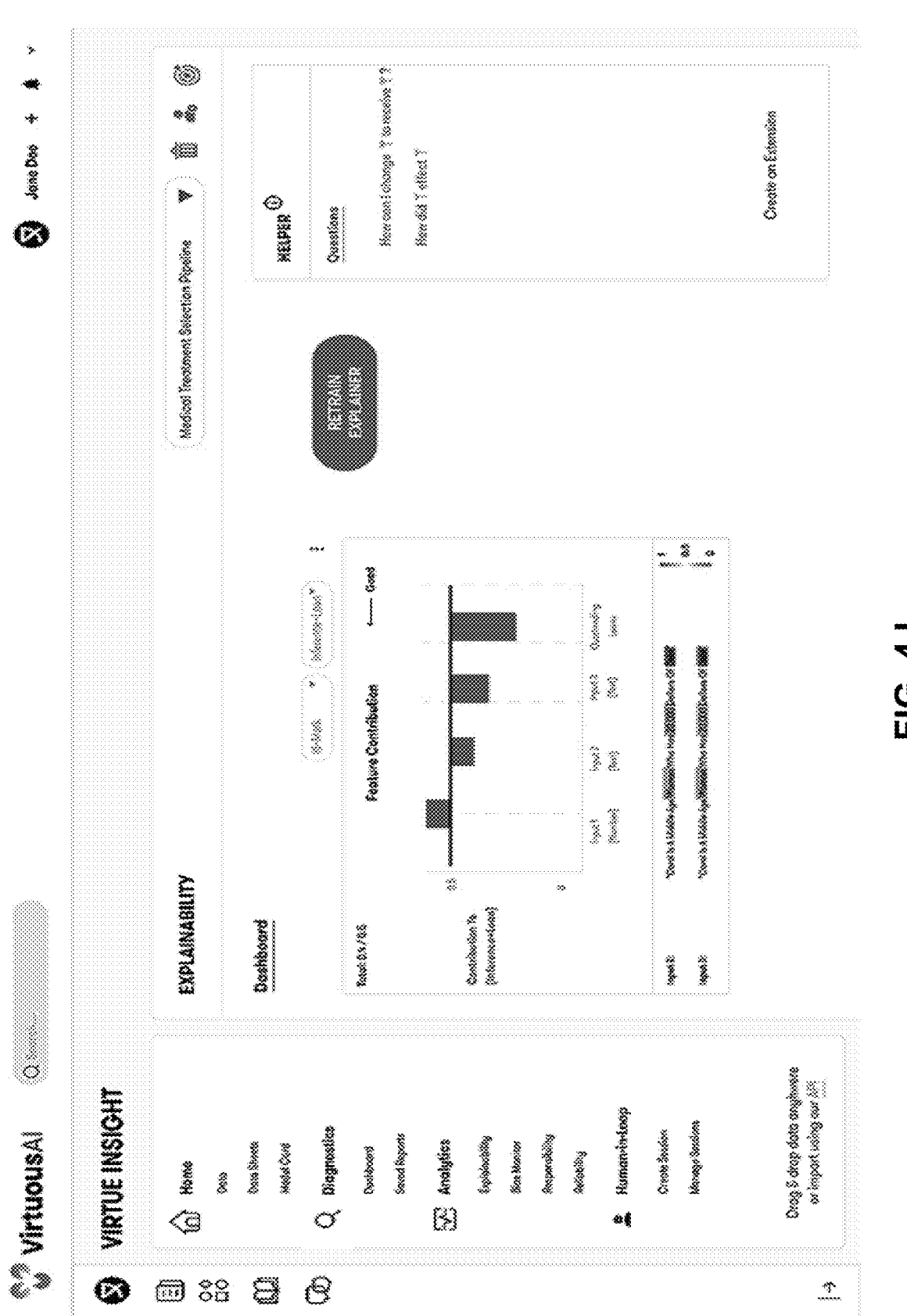

In FIG. 4H, the equitability scoring window/bias monitor is selected and several different data overviews are presented in various and possibly user selected formats. In FIGS. 4I and 4J, the explainability scoring window/bias monitor is selected and several different data overviews are presented in various and possibly user selected formats. In FIG. 4I, a macro-view of a data overview is shown that breaks down a "loan" metric onto four different components. In FIG. 4J, a micro-view is shown where total/overall score ("good") is presented along with a breakdown of various inputs/features that contribute to that score. A prompt is provided that allows the user to retrain the explainer (e.g., the explainability virtue scoring model). In the panel on the right, the user can query the system on the effects of selected features and how to change certain features to receive certain scores, for example. In addition, the user is presented an option to create an extension.

Figure 4K:

FIG. 4K presents an interface on the CACP that uses the control panel generation tools to permit the user to create one or more customized control panels. Templates are available related to the categories "healthcare" and "finance" for users that want to start from a pre-existing control panel configuration, as well as a blank template for users that wish to start from scratch. As indicated, control panels can be designated as either public or private. As shown in the bottom of the screen display, a user that does not see a feature he/she wants, they may add feedback to the administrator of the platform to perhaps include this in a later release.

Figure 4L:
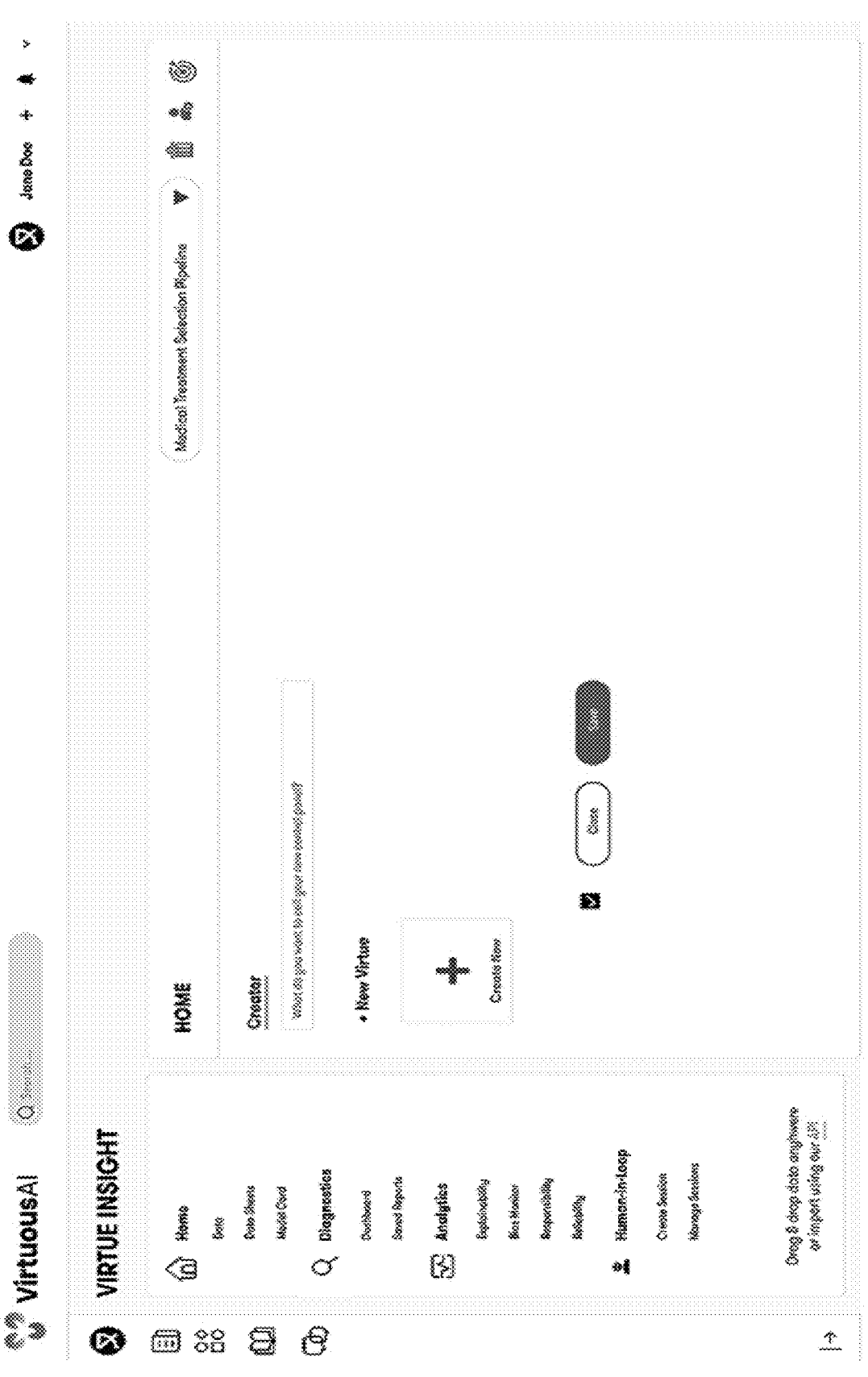
Figure 4M:
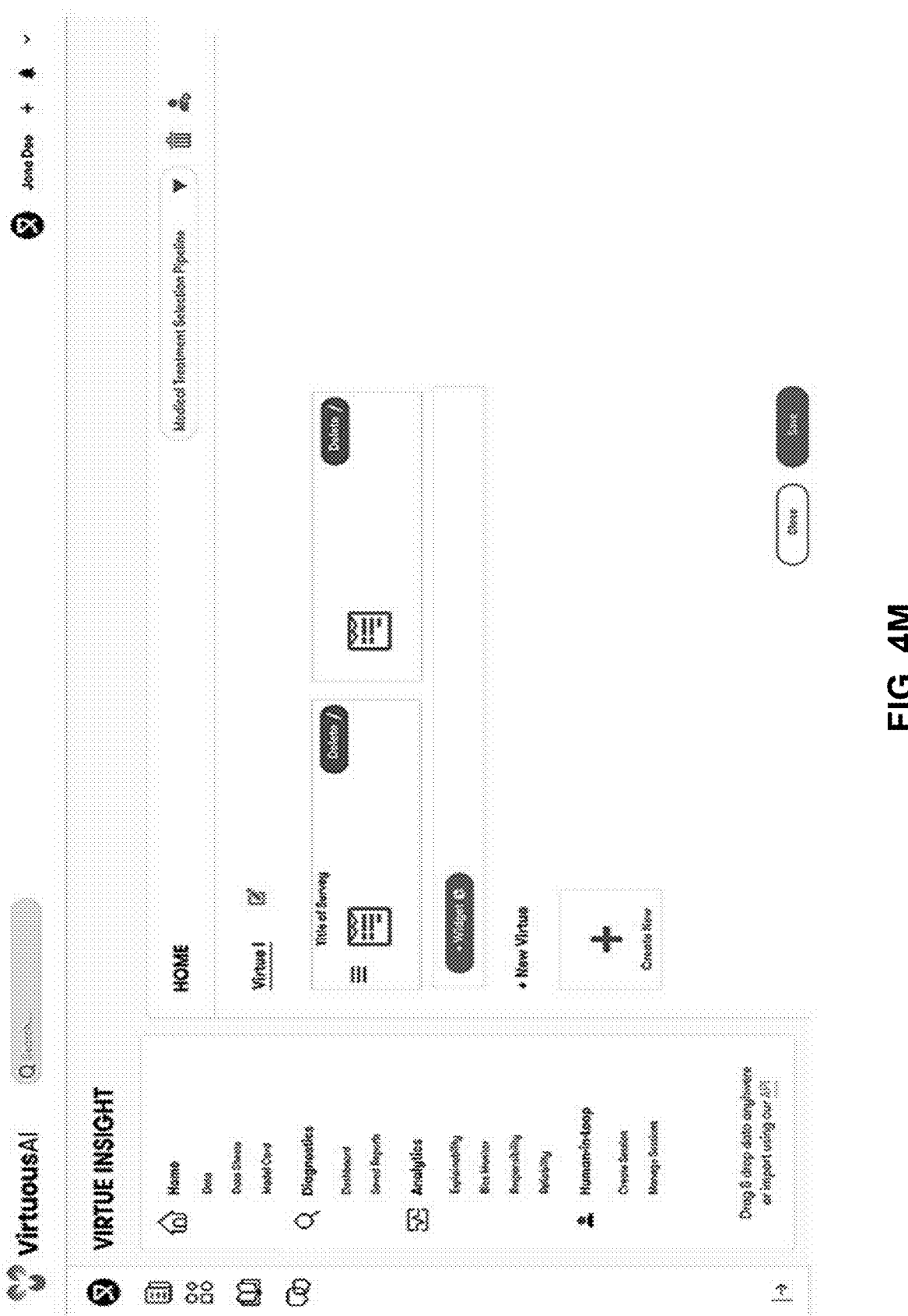
Figure 4N:
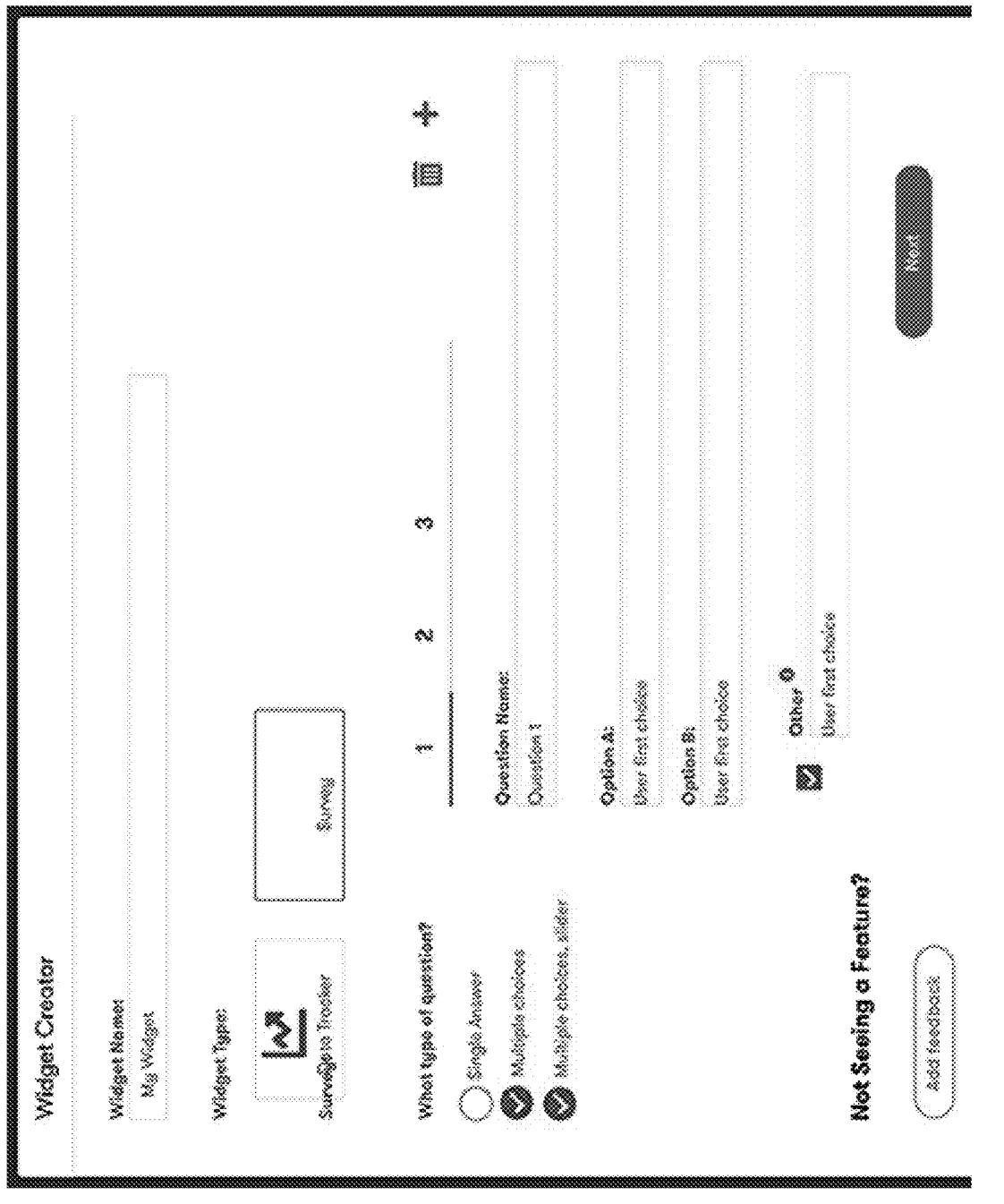
Figure 40:
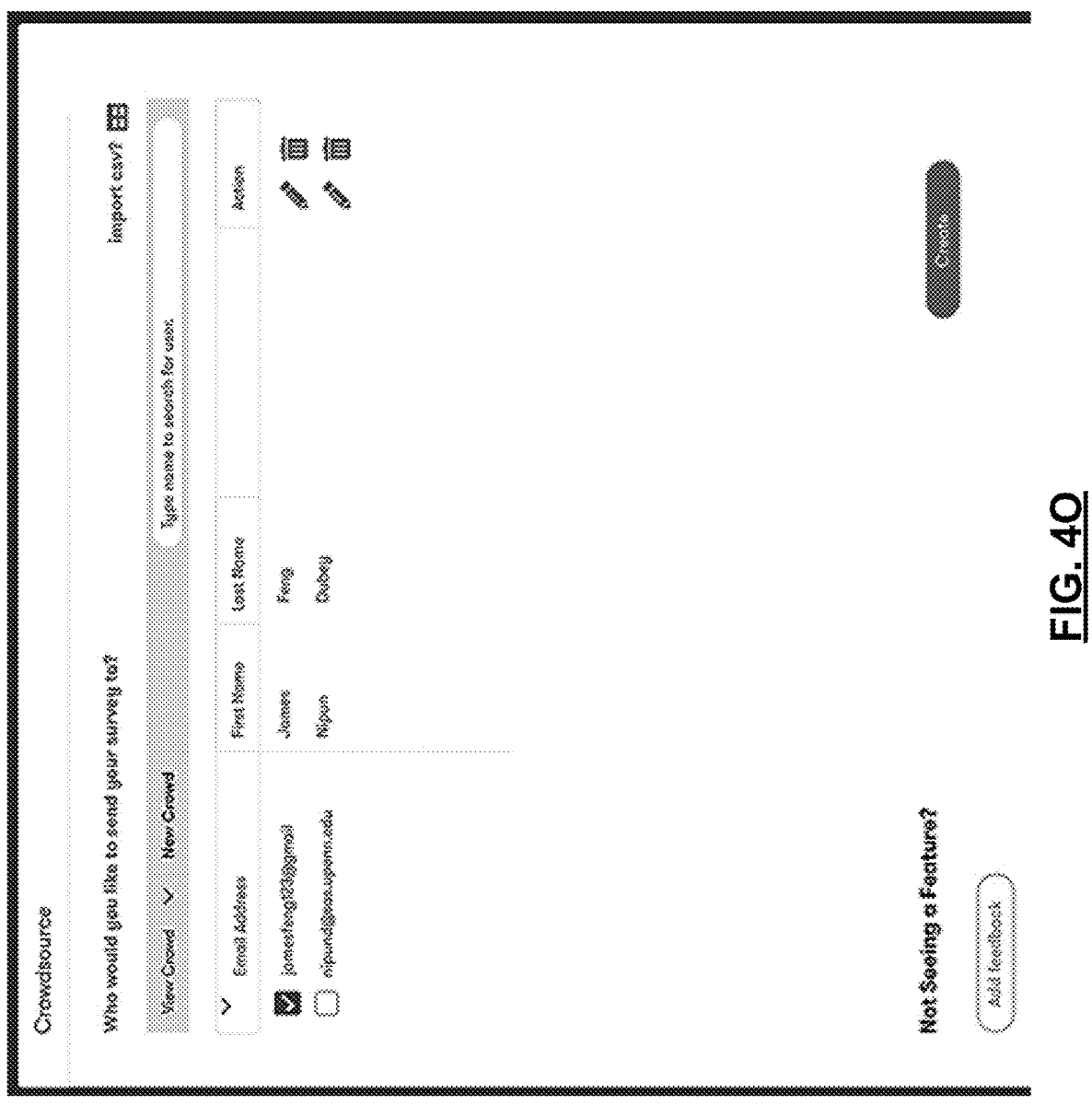
Figure 4P:
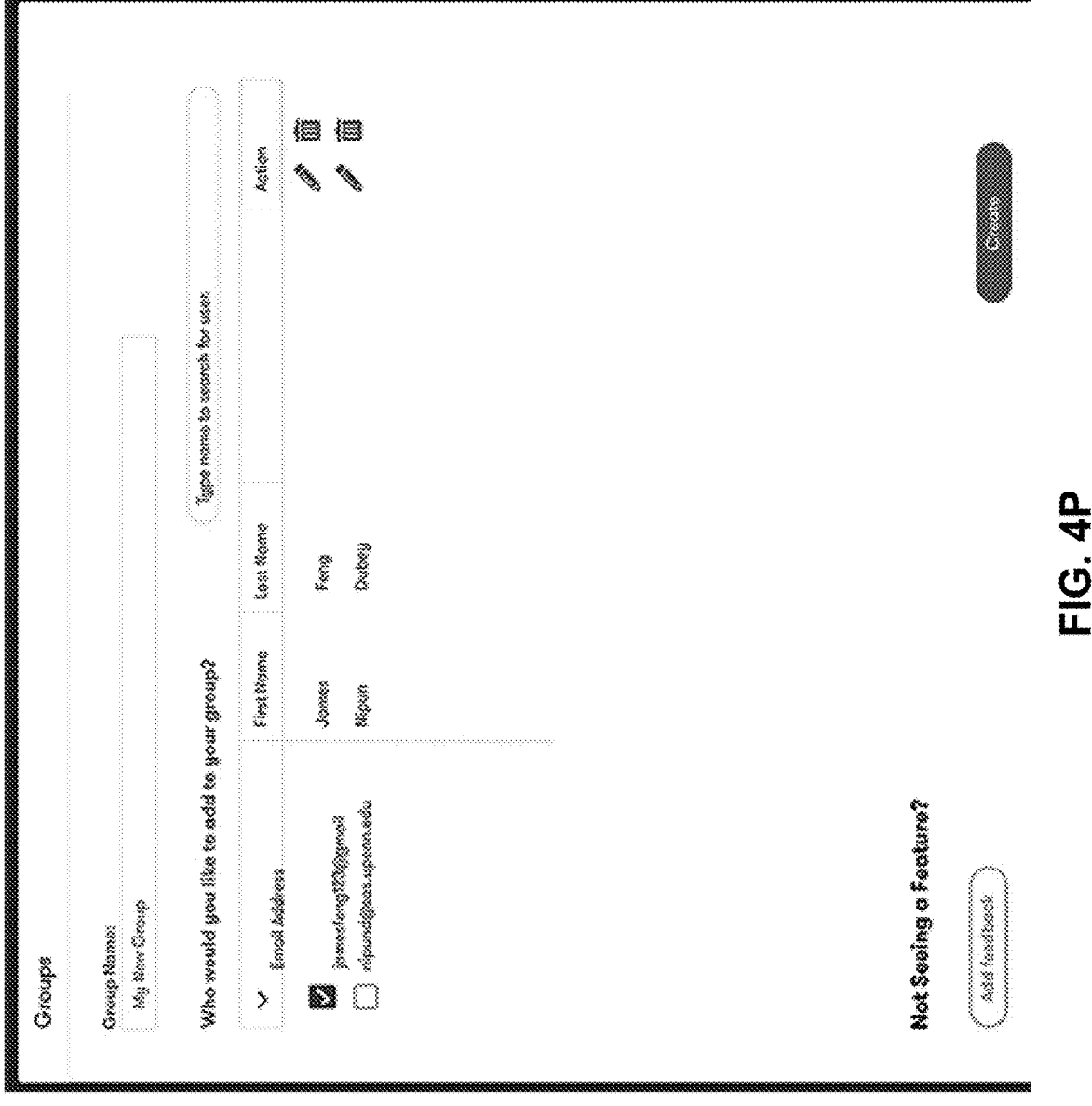
Figure 4Q:
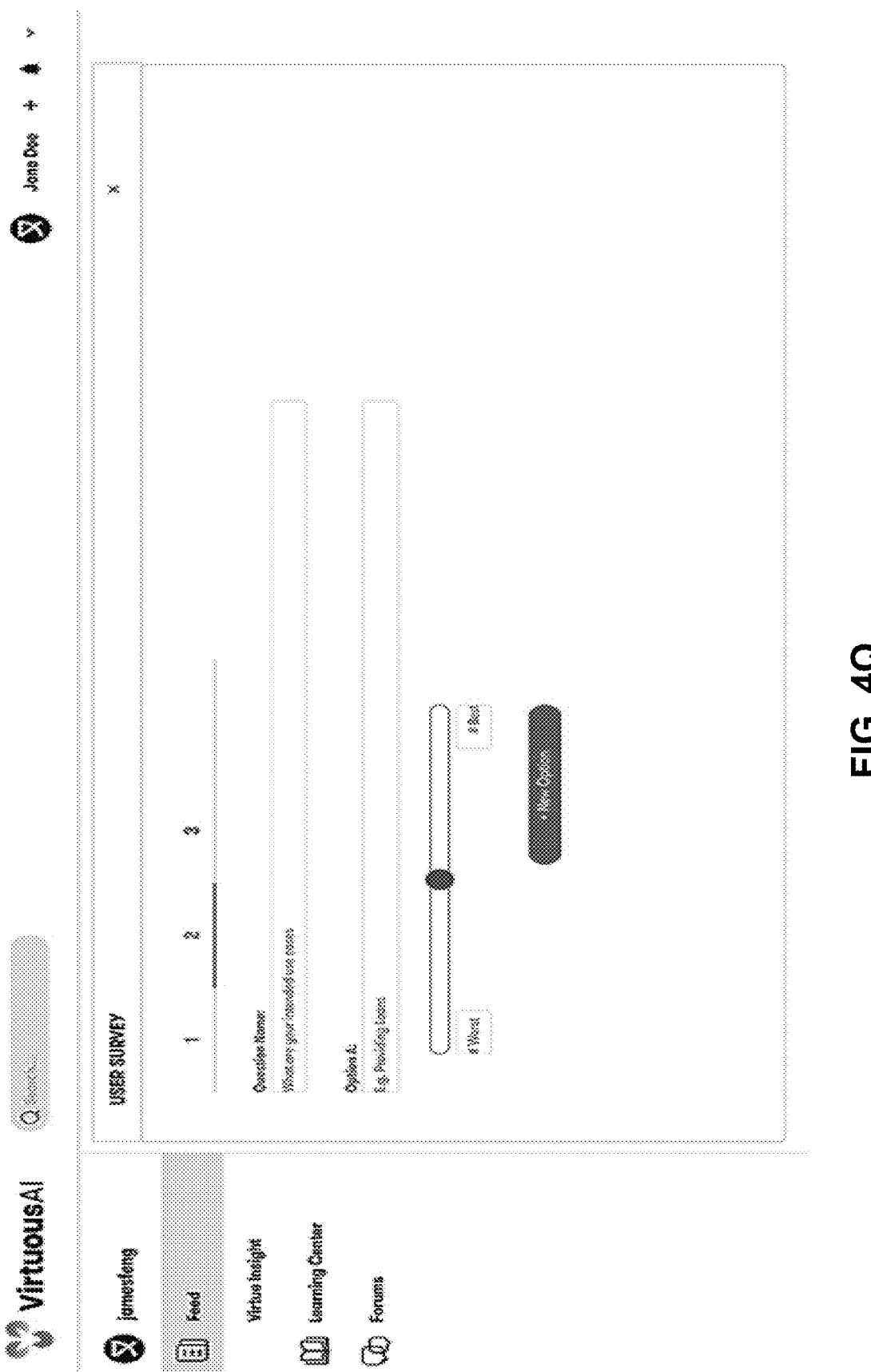

In FIG. 4L, the user has selected to create a new control panel and prompted to enter a control panel name. The user is also allowed to create a scoring model for a new/customized virtue. In FIG. 4M, the user has used a survey widget to create a survey for a new virtue "Virtue I". FIG. 4N, an example of the survey widget are shown. In FIG. 4O, the user selects the audience for completing the survey based on particular names and email addresses—i.e. to generate survey input/results. The user can select an existing crowd, employees for example, create a new crowd as shown in FIG. 4P, or proceed on a general crowd source. A screen display generated by the survey widget for a new survey is presented in FIG. 4Q.

Figure 4R:
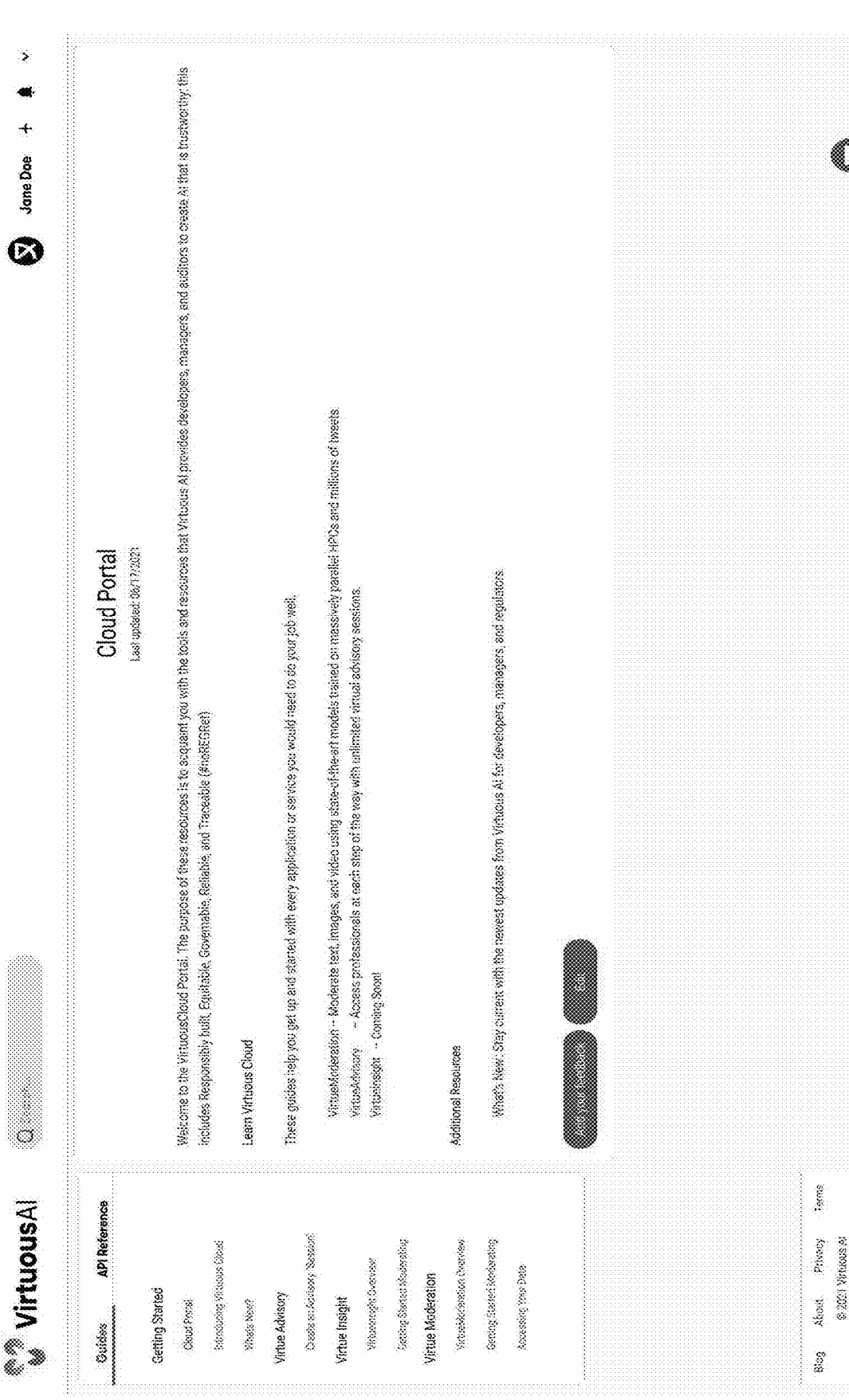
Figure 4S:
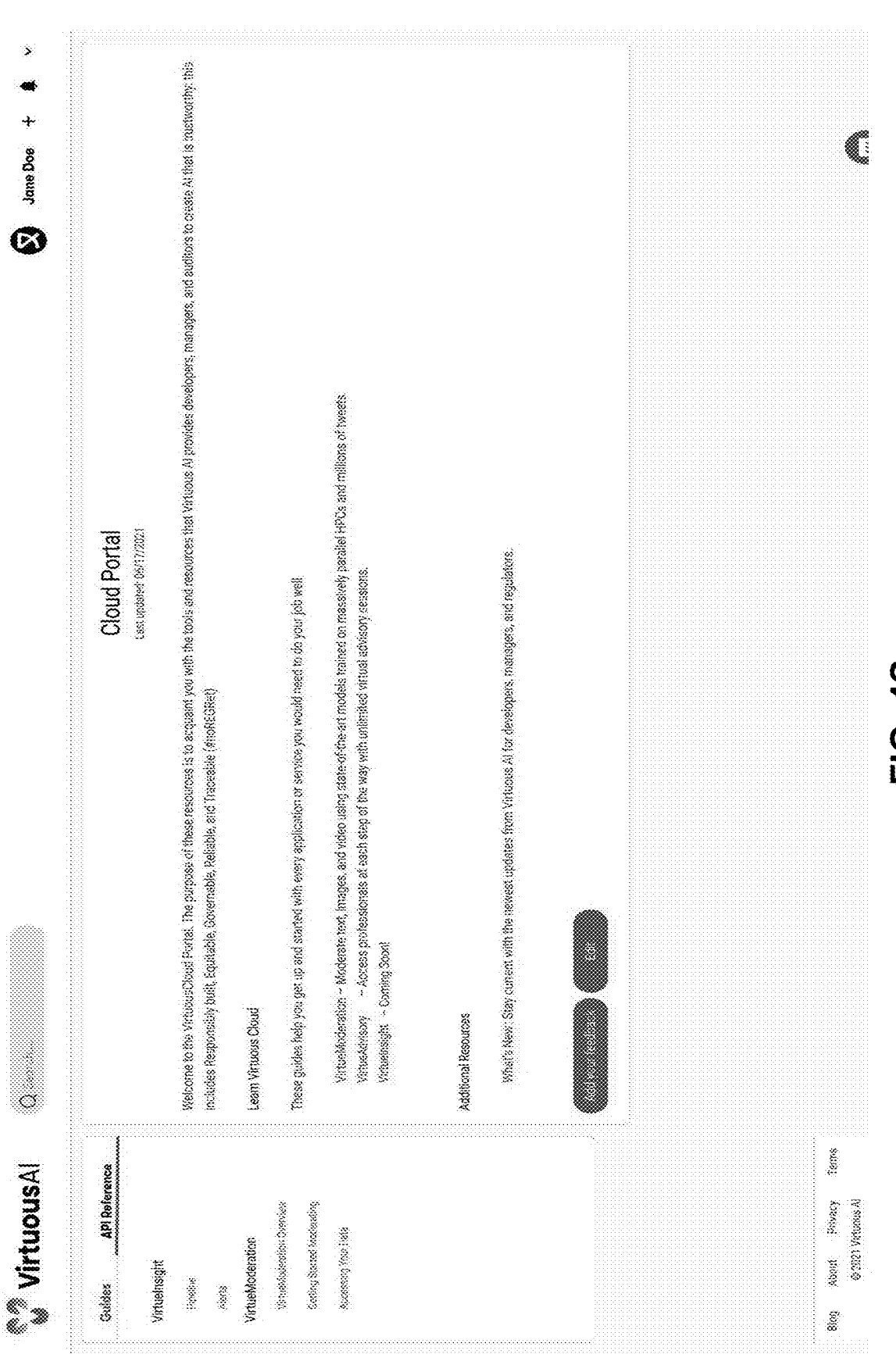
Figure 4T:
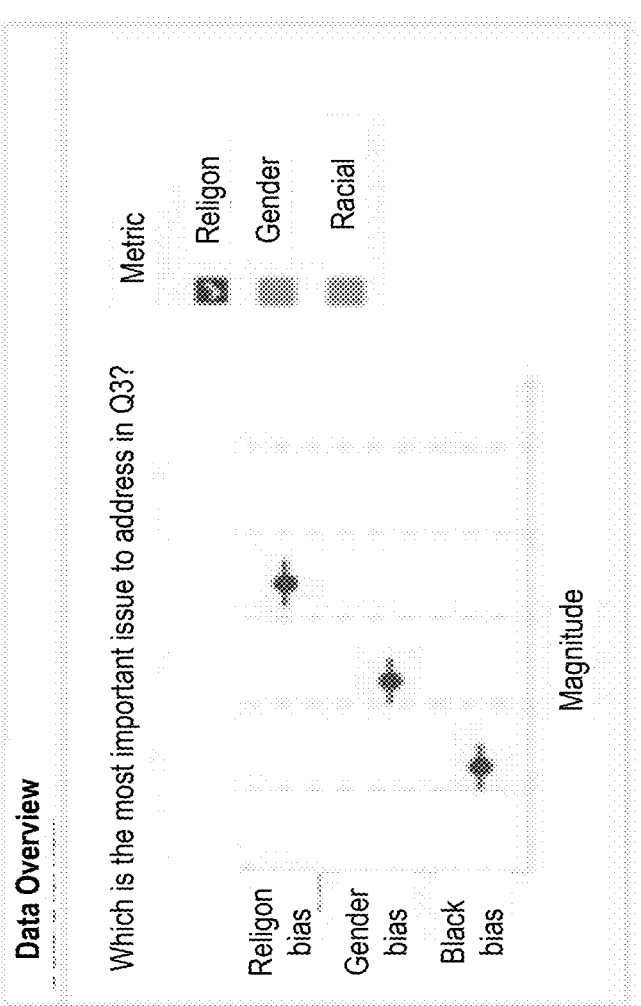
Figure 4U:
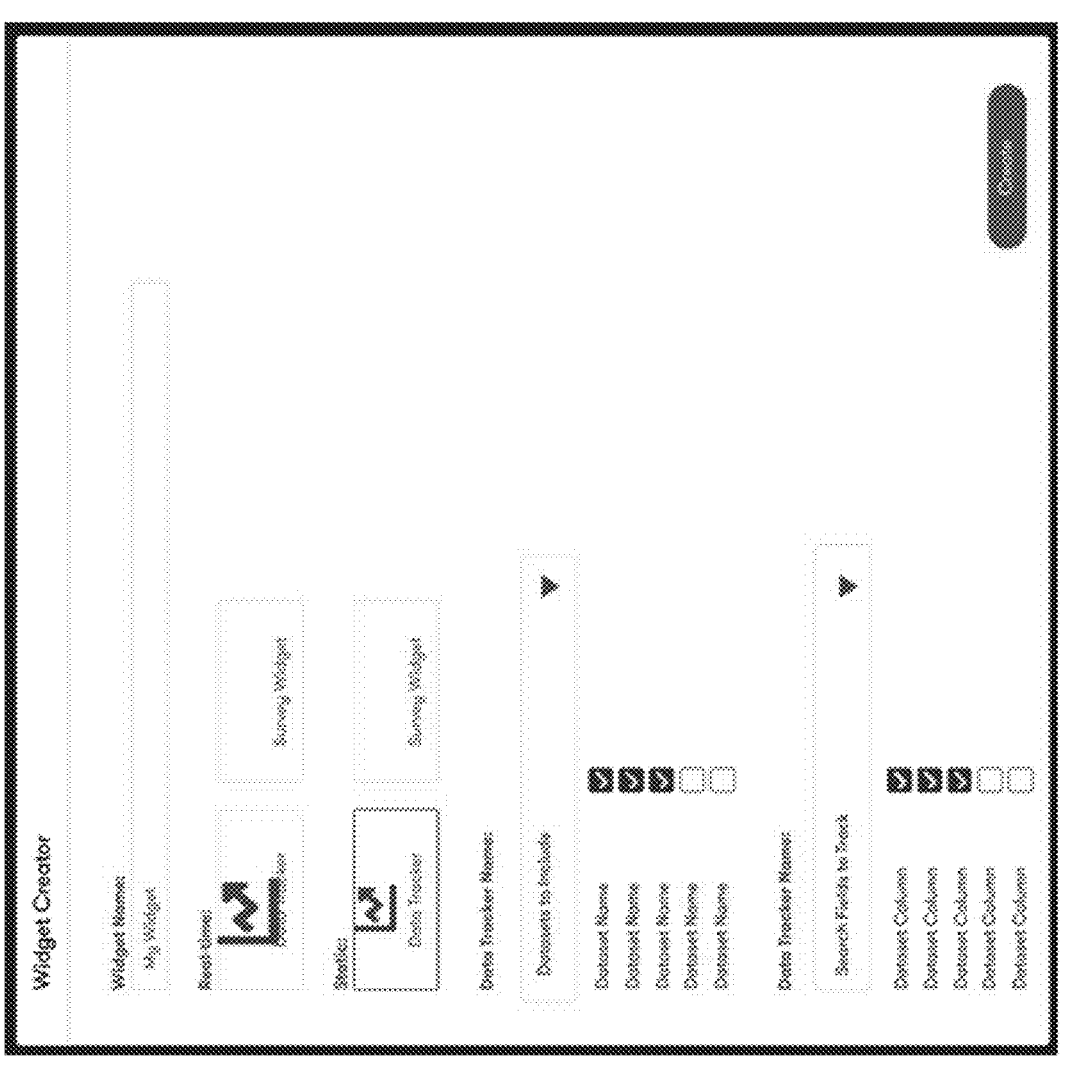
Figure 4W:
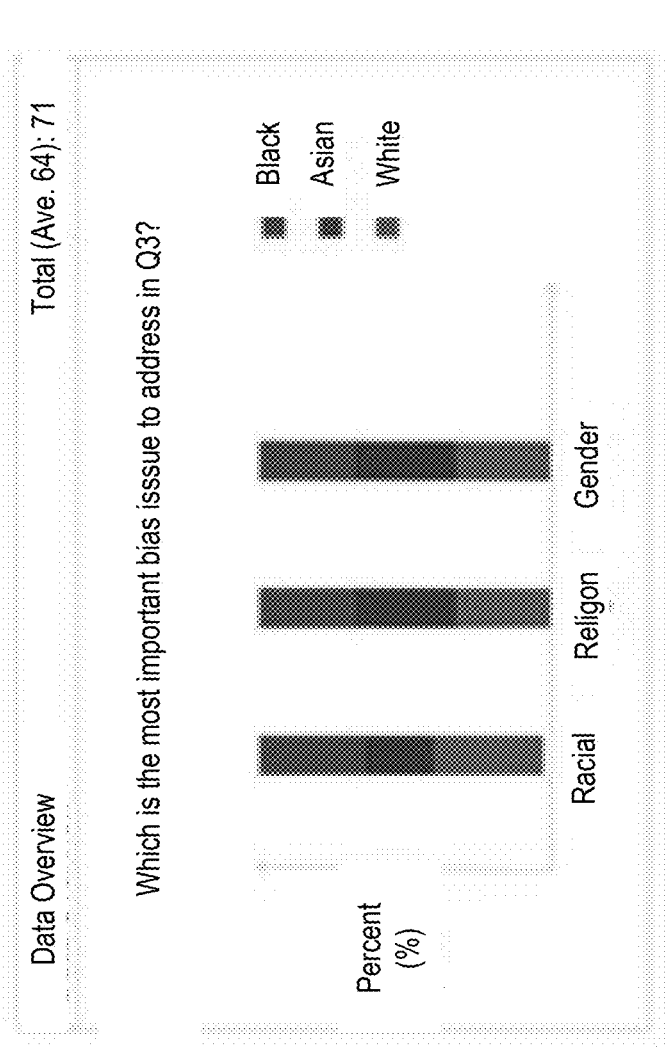
Figure 4X:
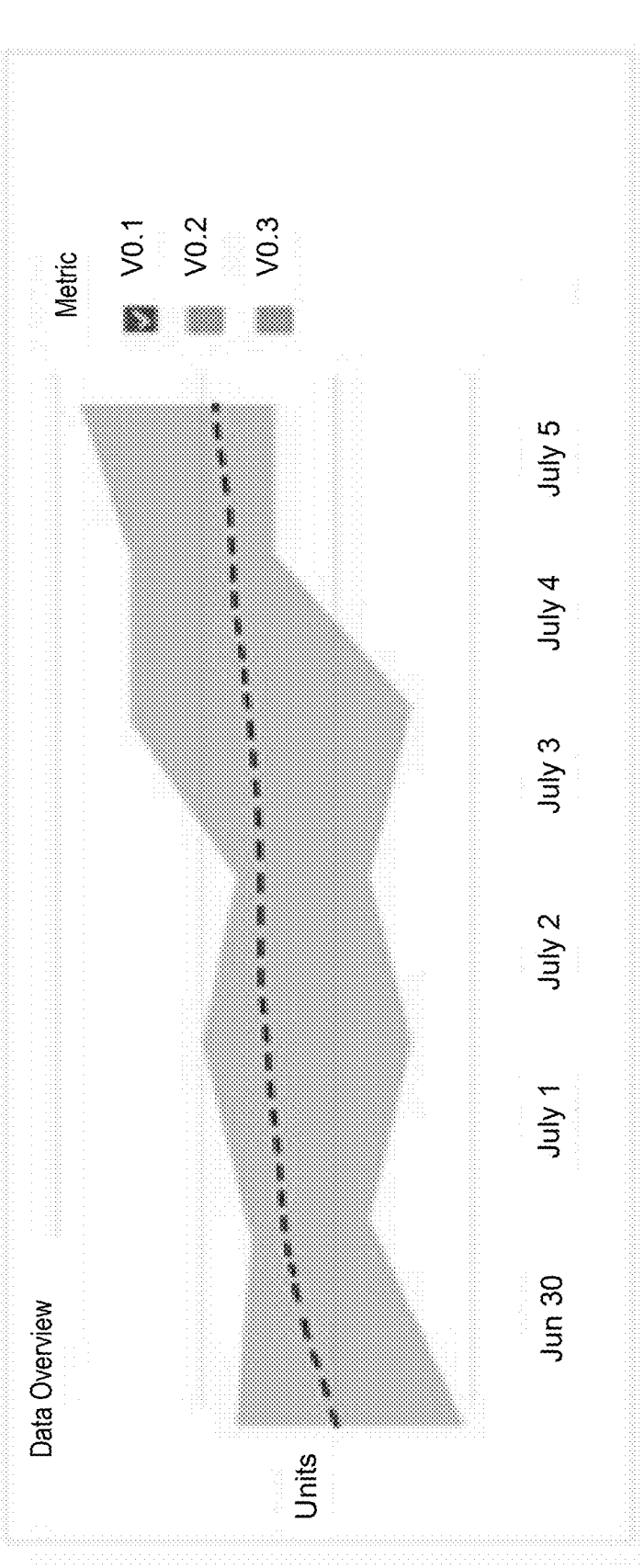
Figure 4Y:
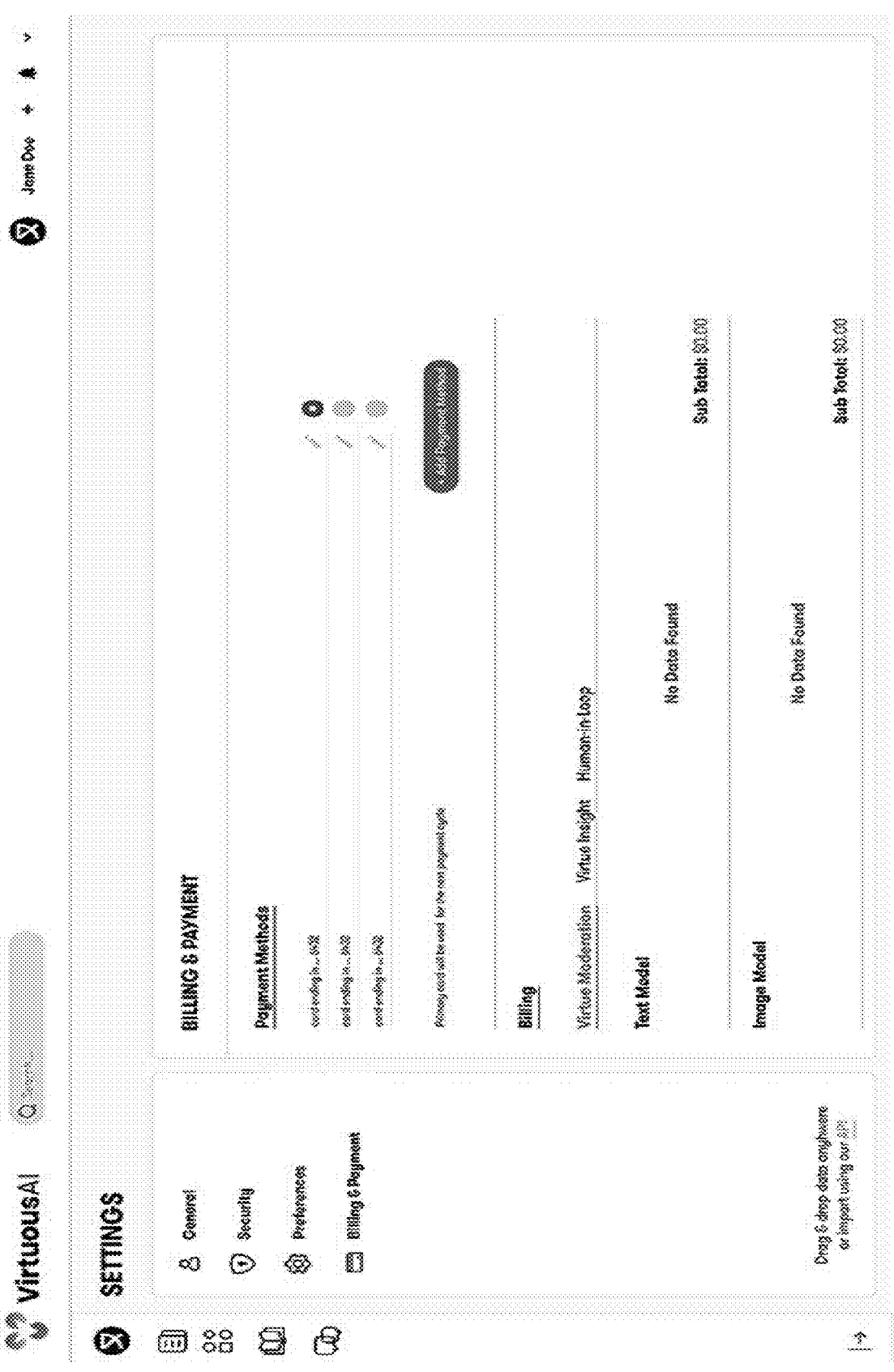

FIG. 4R presents a cloud portal of the CACP that presents various service guides and a link to the news feed of FIG. 4A. In FIG. 4S, the user is selecting to access the API reference materials. FIG. 4T presents a static/predetermined survey, magnitude slider that can be used to customize an AI analysis widget corresponding to the bias monitor and equitability scoring model to enable virtue tracing based on scoring magnitudes. FIG. 4U presents a widget creator that allows a user to create/customize his/her own widgets. In FIG. 4V-4X, the user has selected different output formats for display in conjunction with the AI analysis widget corresponding to the bias monitor and equitability scoring model. FIG. 4Y presents a billing and payment screen.

Figure 5A:
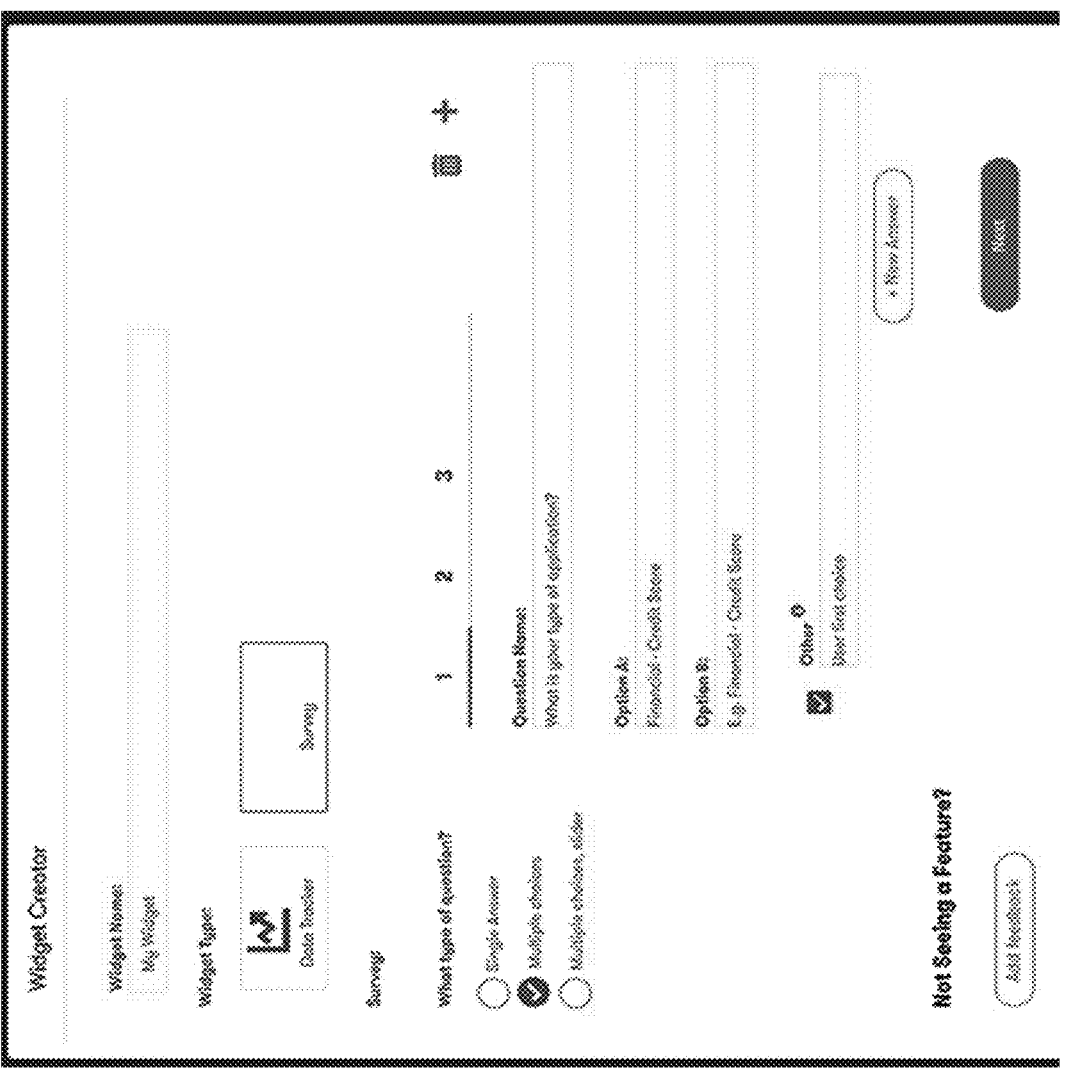
FIGS. 5A-5D present graphical diagram representations of example screen displays or portions thereof.
Figure 5B:
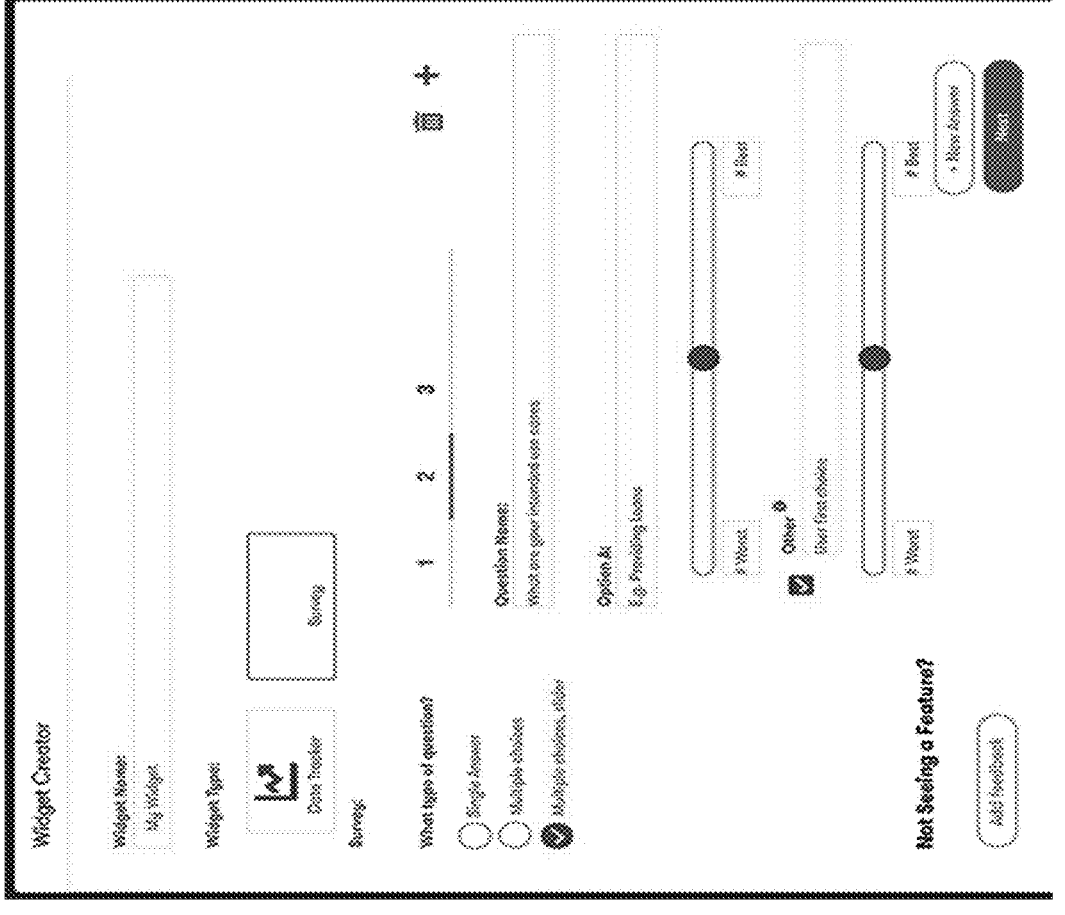
Figure 5C:
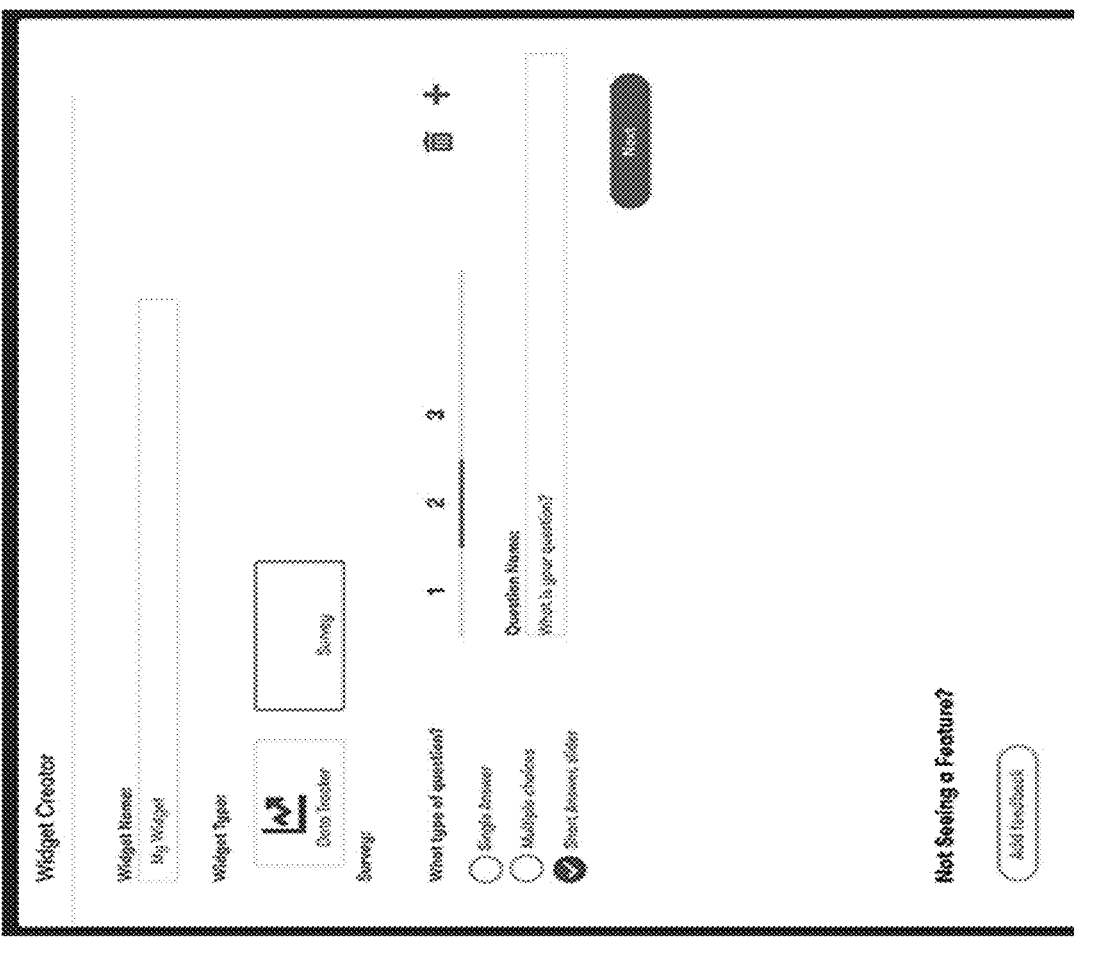
Figure 5D:
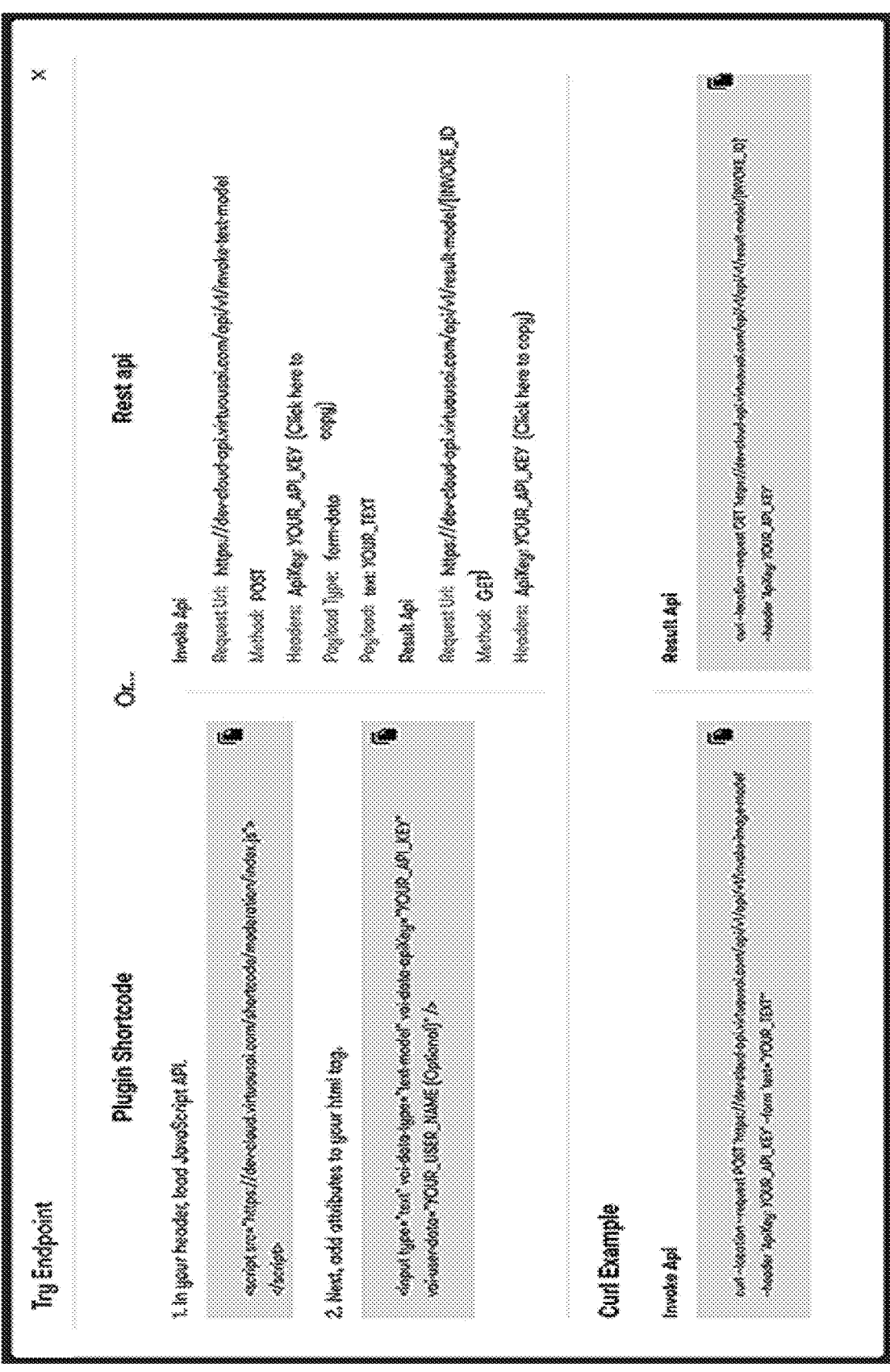
Figure 6A:
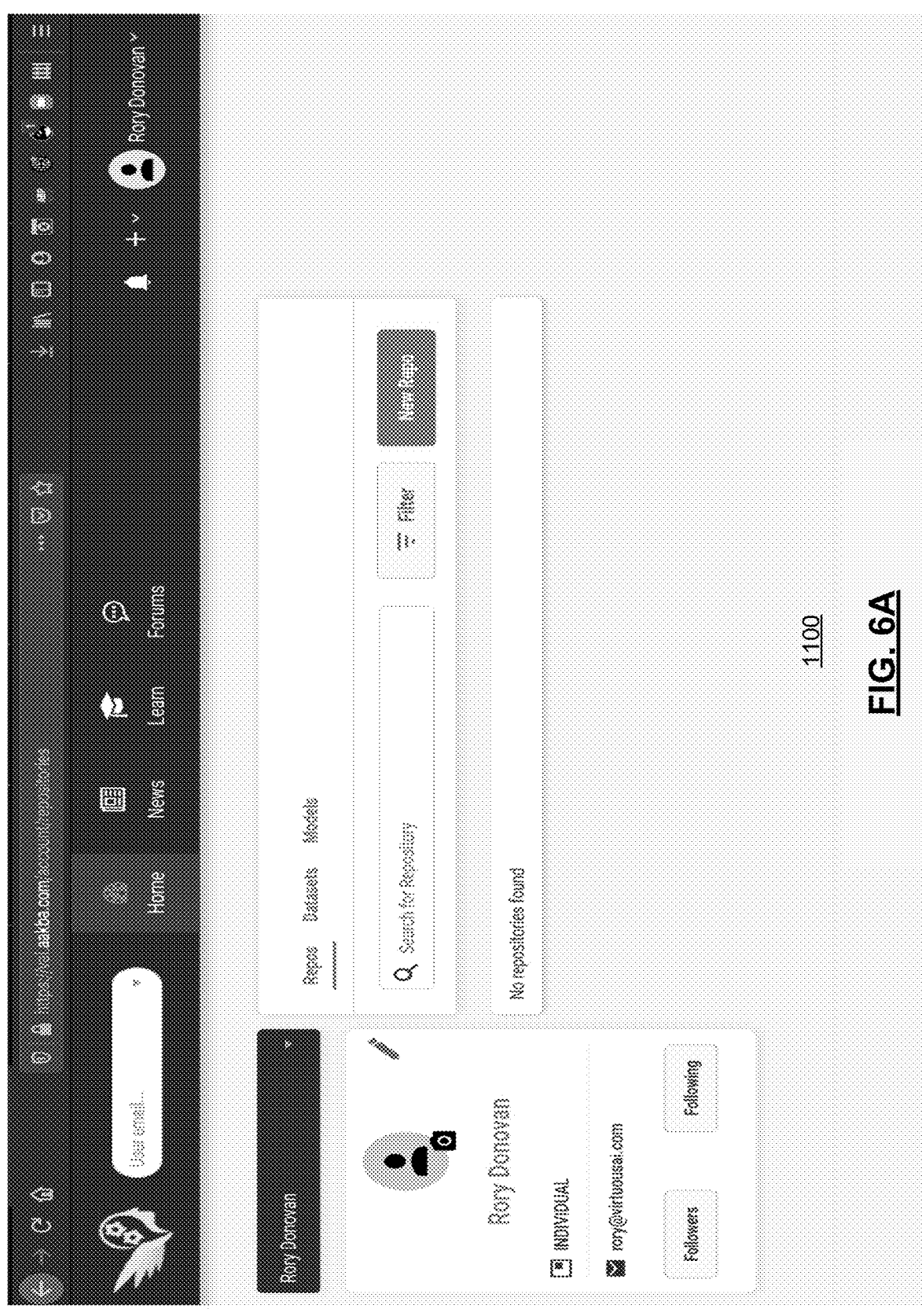
FIGS. 6A-6F present graphical diagram representations of example screen displays or portions thereof.
Figure 6B:
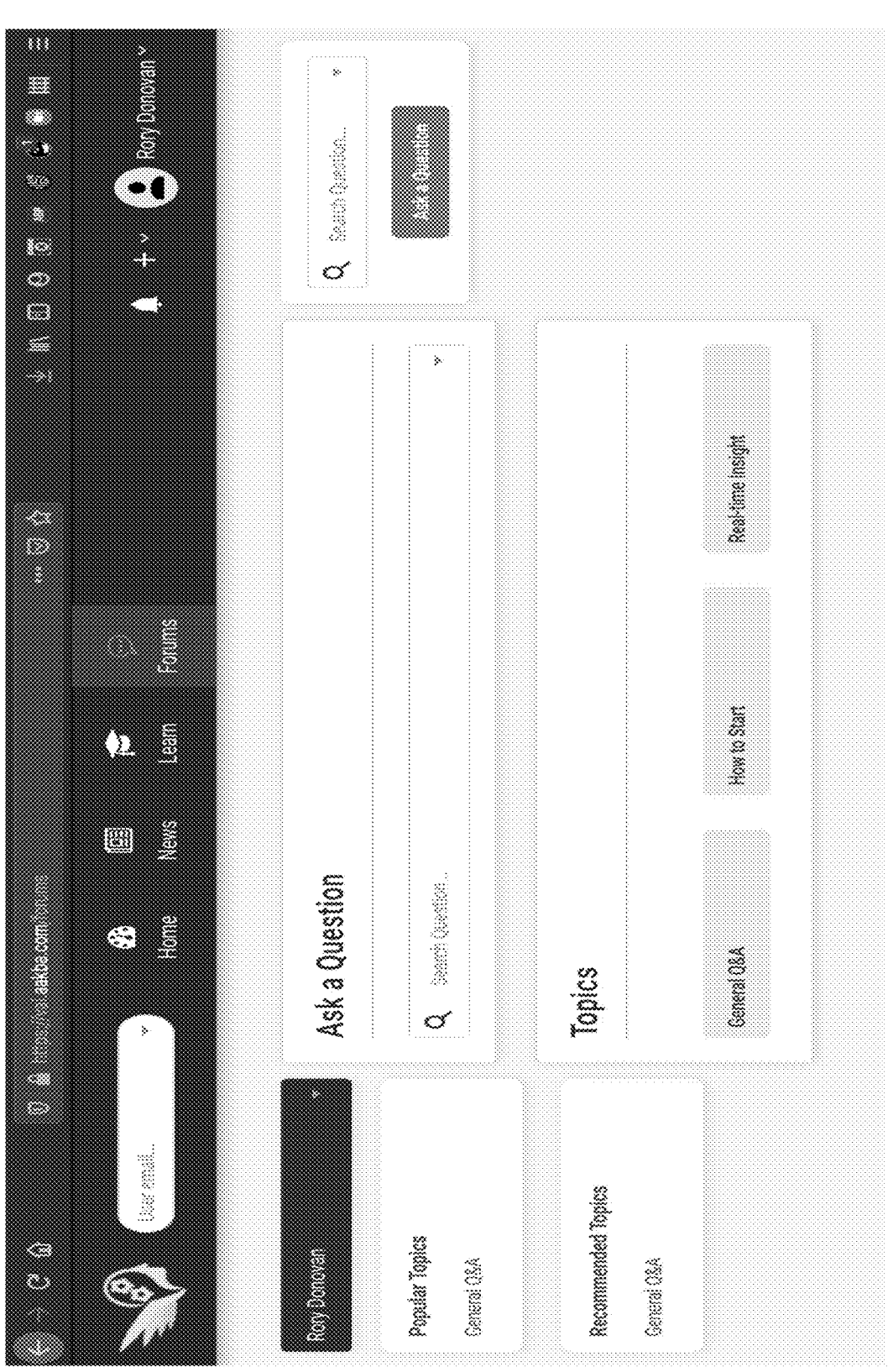
Figure 6C:
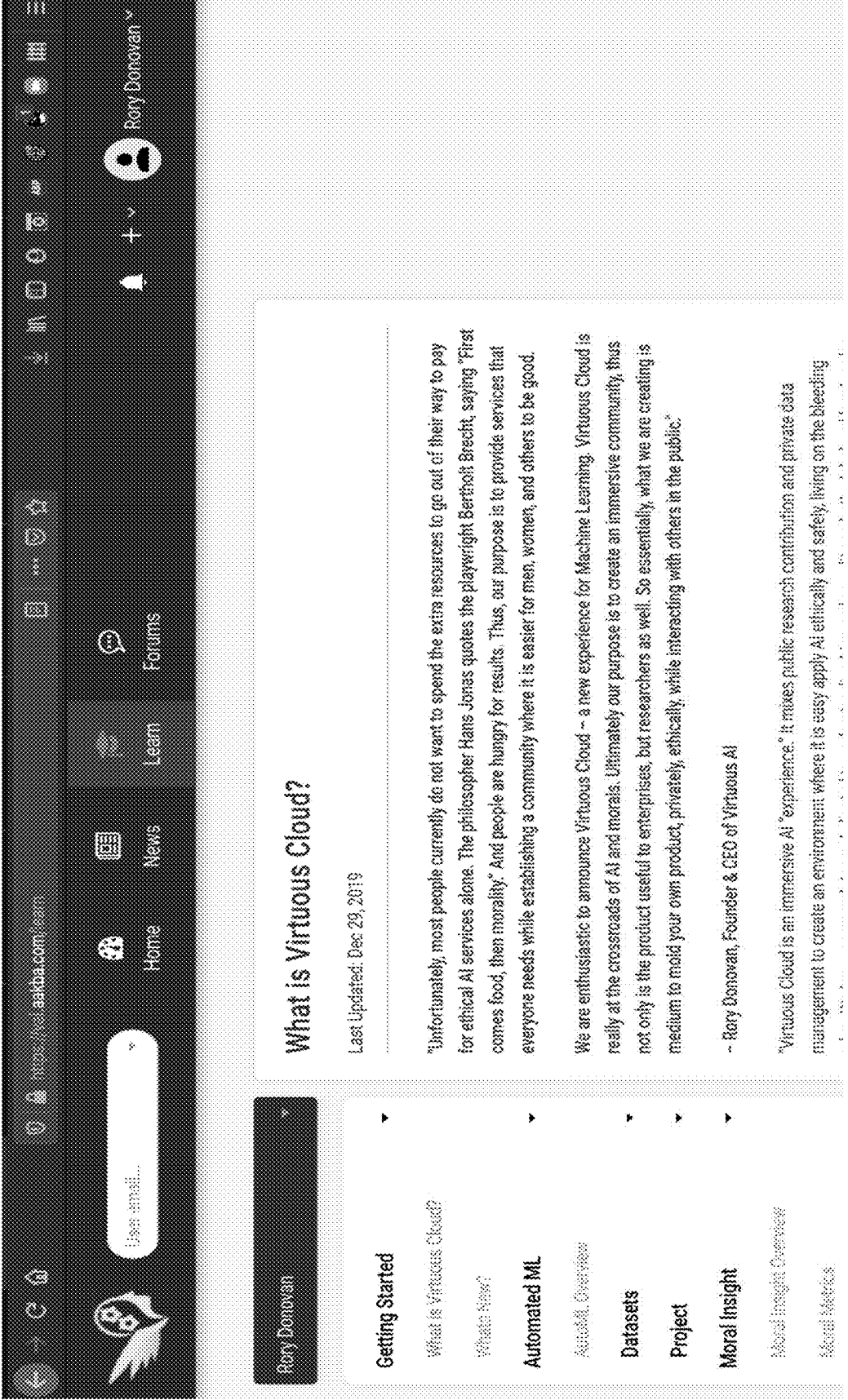
Figure 6D:
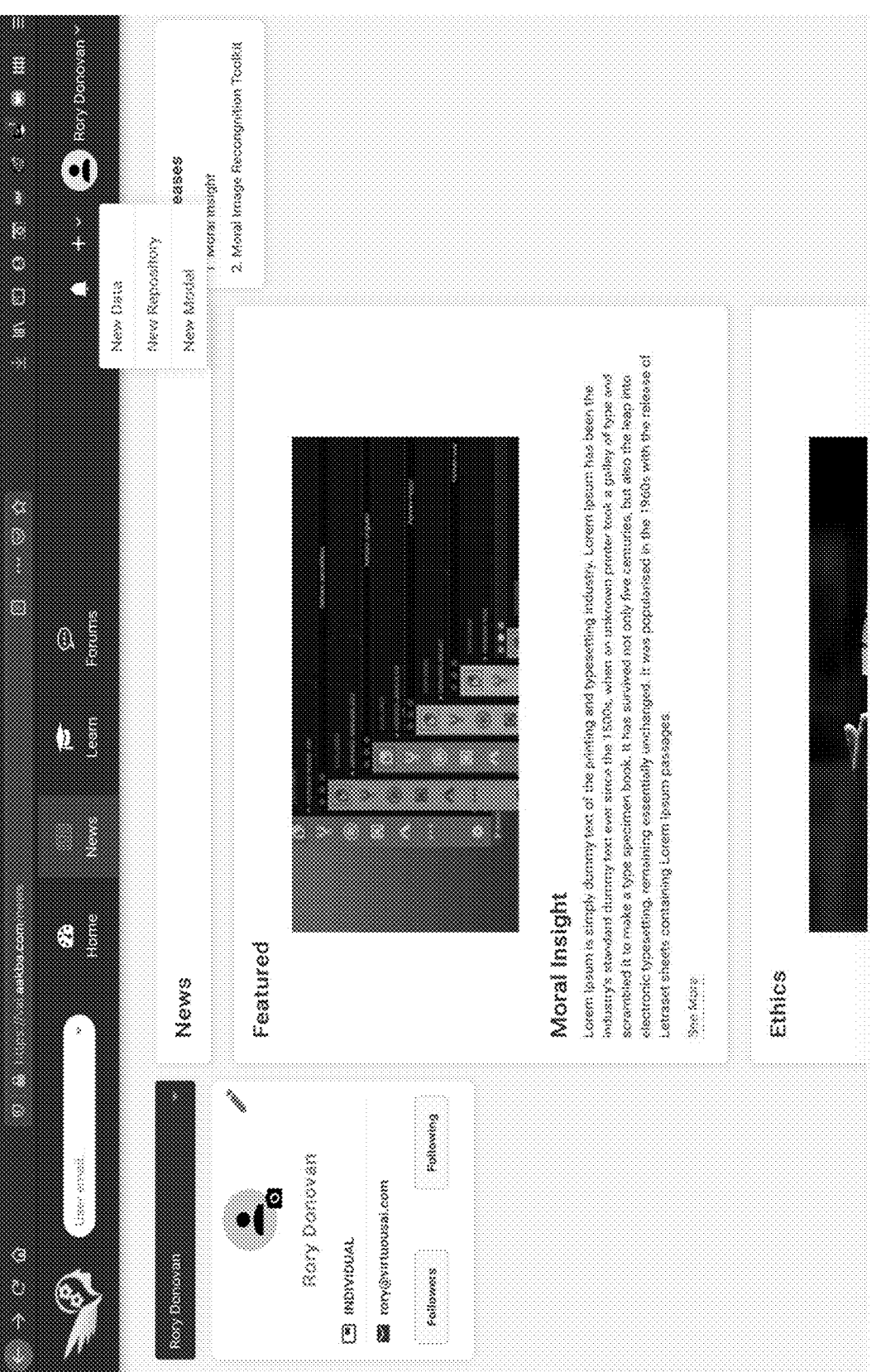
Figure 6E:
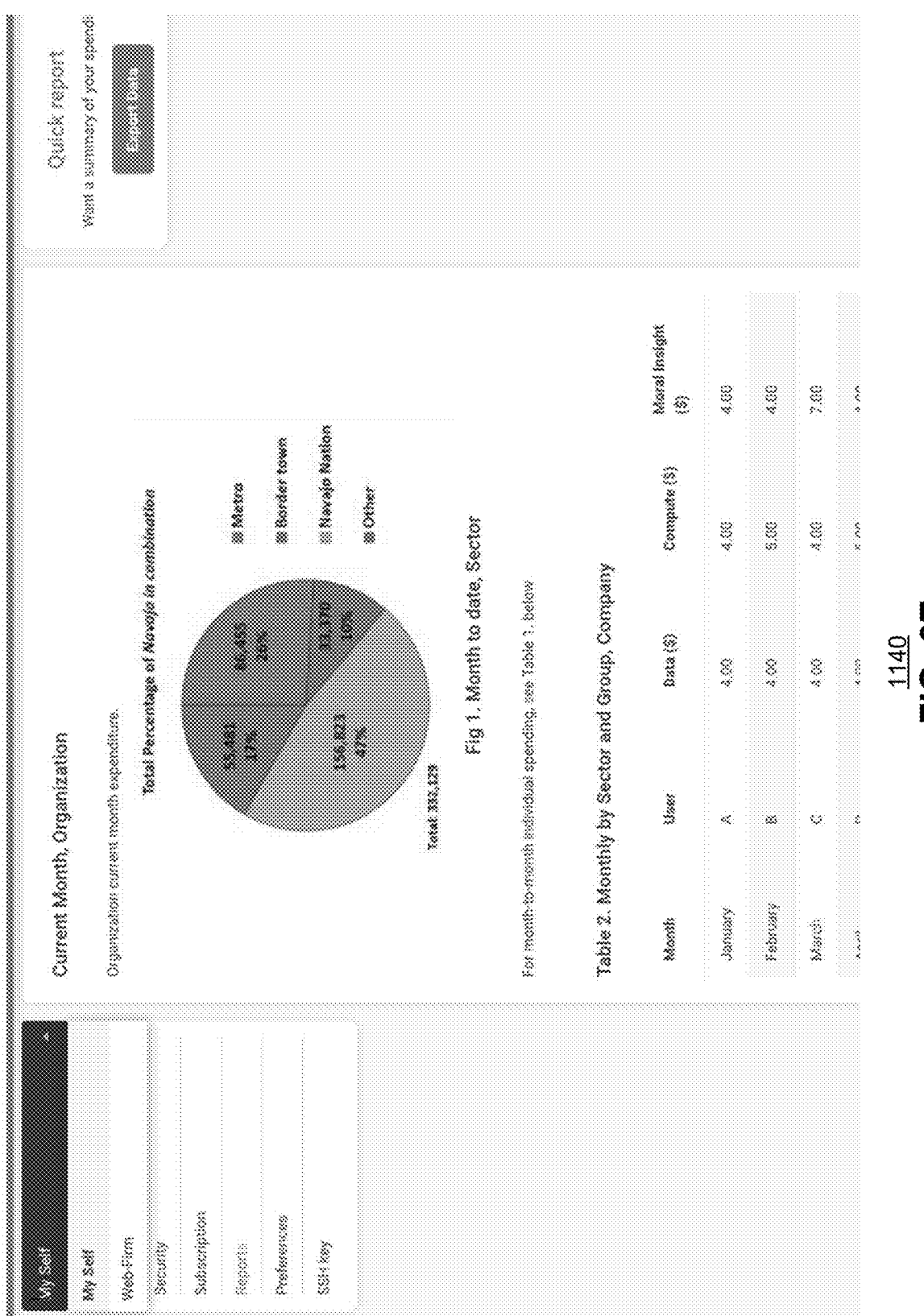
Figure 6F:
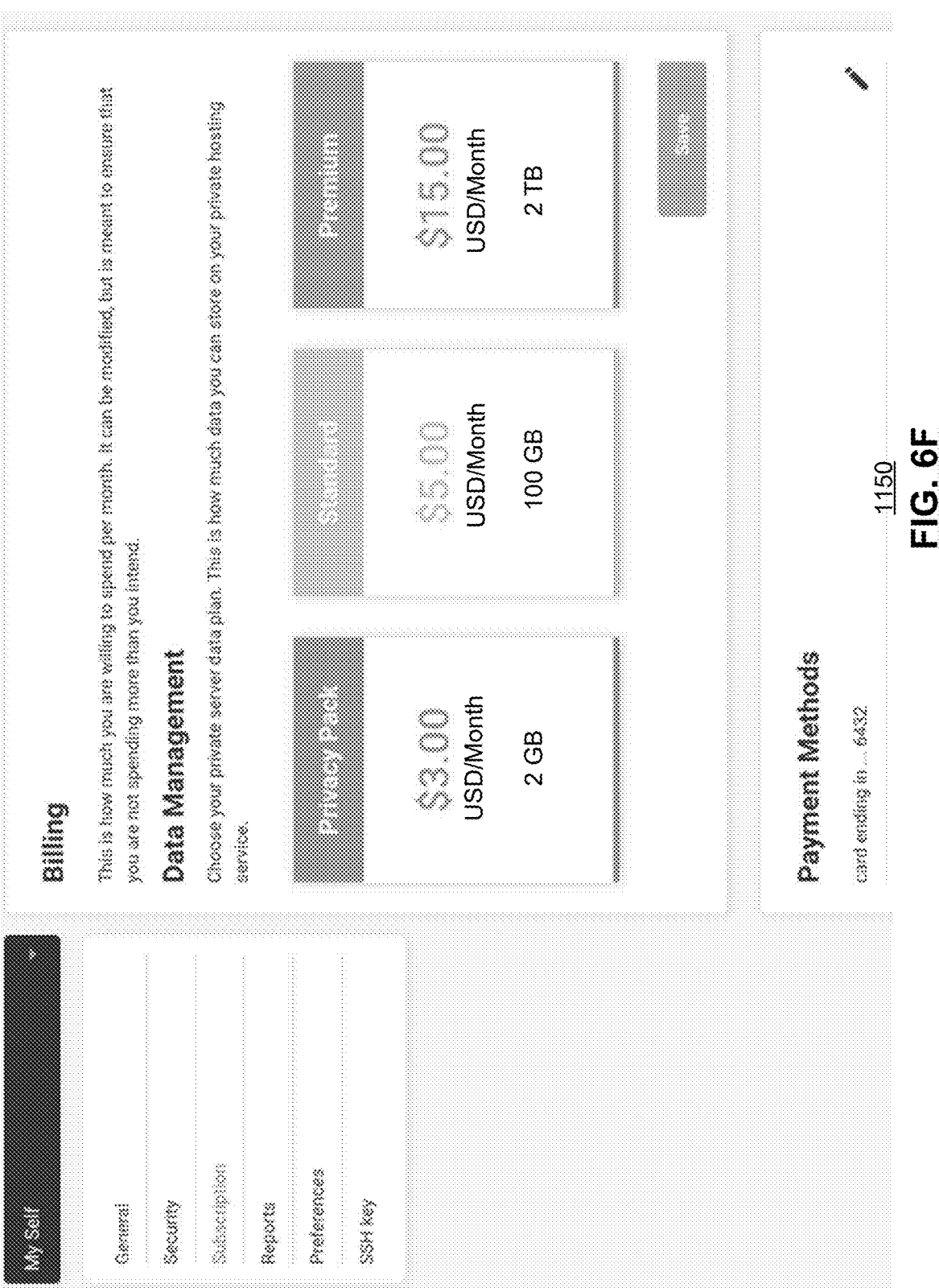

In FIG. 5A, the survey widget configures a survey for multiple-choice questions. In FIG. 5B, the survey widget configures a survey with multiple-choice questions with answers input by users via slider-bars. In FIG. 5C, the survey widget configures a survey with short answers input by users. In FIG. 5D, API options and instructions are provided to facilitate the input of datasets.

FIGS. 6A-6F present graphical diagram representations of example screen displays or portions thereof of another example content analysis control panel. In particular, example screen displays are presented as part of the graphical user interface implemented via the AI development platform 800.

In various embodiments, the AI development platform 800 supports a communal development framework that allows users to view repositories on people's walls, view other profiles to see public work, promote trust through transparency, allow people to be involved in decisions, add friends and follow people and organizational work, approve/disapprove work, borrow others code by forking or cloning their repository. This communal development framework also supports AI ethics discussion in ethics forums, and/or other forums where a user posts a question, others can answer, and users can comment on question and answers. Documentation can be provided in a "Learn" section which includes information on AI how to use Version Control, Data API, an AI moral insight model, etc. In various embodiments, only users/subscribers are allowed to post, but others can look at questions and answers.

In various embodiments, this communal development framework also supports a news feed that allows users to educate themselves on machine learning, ethics, current events in AI ethics, etc. Users can also create their own content. Tools can be provided to aid users in setting the tone of their contributions and otherwise to provide a guide on how to post. This communal development framework also supports organizational billing for cloud services allowing users to, for example, choose their organization with billing credentials and print out a quick report. Variable subscription plans can be offered that allow users to subscribe to the specific services and/or level of use they may need.

As used herein the terms "widget", "tool" and "toolkit" correspond to a website, utility, platform, computer, cloud device and/or software routine that performs one or more specific functions.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such a advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if –X<–5, and the comparison to determine if signal A matches signal B can likewise be performed by determining –A matches –B or not (A) matches not (B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
    generating, via a machine that includes at least one processor and a non-transitory machine-readable storage medium and utilizing a graphical user interface, a content analysis control panel;
    receiving, via the machine, content data generated via a first at least one AI model;
    generating, via the machine, a virtue scoring model based on training a plurality of second AI models of the virtue scoring model based on training data, wherein the training data is different from the content data, and wherein the plurality of second AI models is different from the first at least one AI model;
    detecting, via one or more third AI models implemented via the machine and different from the first at least one AI model and the plurality of second AI models, detection data that includes first portions of the content data associated with a protected attribute and second portions of the content data associated with a predetermined metric;
    generating, via the machine, analysis data associated with the protected attribute and the predetermined metric;
    generating, via applying the plurality of second AI models of the virtue scoring model, virtue score data for the first at least one AI model based on:
        applying the plurality of second AI models to generate a corresponding plurality of sub-result data based on processing the analysis data; and
        generating the virtue score data for the first at least one AI model based on the corresponding plurality of sub-result data generated via applying the plurality of second AI models;
    facilitating display, via the content analysis control panel, of:
        the virtue score data; and
        the analysis data associated with the protected attribute and the predetermined metric; and
    retraining, based on the virtue score data, the first at least one AI model to generate an updated first at least one AI model.

2. The method of claim 1, wherein the protected attribute is a potential source of discrimination.

3. The method of claim 2, wherein the potential source of discrimination is at least one of: gender, race, age, religion, ethnicity, sexual preference, or disability.

4. The method of claim 3, wherein the predetermined metric is a key performance indicator that varies based on the potential source of discrimination.

5. The method of claim 3, wherein the predetermined metric is a term that varies based on the potential source of discrimination.

6. The method of claim 3, wherein the predetermined metric indicates at least one grade point average.

7. The method of claim 3, wherein the predetermined metric indicates at least one salary.

8. The method of claim 3, wherein the predetermined metric indicates at least one of: at least one job offer or at least one job promotion.

9. The method of claim 3, wherein the predetermined metric indicates at least one loan approval or disapproval.

10. The method of claim 3, wherein the predetermined metric indicates at least one credit score.

11. The method of claim 3, wherein the predetermined metric indicates at least one arrest.

12. The method of claim 1, wherein the training data is based on custom survey data and survey results, and wherein the custom survey data corresponds to a single survey.

13. A system comprises:
    a network interface configured to communicate via a network;
    at least one processor;
    a non-transitory machine-readable storage medium that stores operational instructions that, when executed by the at least one processor, cause the at least one processor to perform operations that include:

generating, via the at least one processor and utilizing a graphical user interface, a content analysis control panel;

receiving, via the at least one processor, content data generated via a first at least one AI model;

generating, via the machine, a virtue scoring model based on training a plurality of second AI models of the virtue scoring model based on training data, wherein the training data is different from the content data, and wherein the plurality of second AI models is different from the first at least one AI model;

detecting, via one or more third AI models implemented via the machine and different from the first at least one AI model and the plurality of second AI models, detection data that includes first portions of the content data associated with a protected attribute and second portions of the content data associated with a predetermined metric;

generating, via the machine, analysis data associated with the protected attribute and the predetermined metric;

generating, via applying the plurality of second AI models of the virtue scoring model, virtue score data for the first at least one AI model based on:

applying the plurality of second AI models to generate a corresponding plurality of sub-result data based on processing the analysis data; and generating the virtue score data for the first at least one AI model based on the corresponding plurality of sub-result data generated via applying the plurality of second AI models;

facilitating display, via the content analysis control panel, of:

the virtue score data; and the analysis data associated with the protected attribute and the predetermined metric; and retraining, based on the virtue score data, the first at least one AI model to generate an updated first at least one AI model.

14. The system of claim 13, wherein the protected attribute is a potential source of discrimination, and wherein the potential source of discrimination is at least one of: gender, race, age, religion, ethnicity, sexual preference, or disability.

15. The system of claim 14, wherein the predetermined metric indicates at least one grade point average.

16. The system of claim 14, wherein the predetermined metric indicates at least one salary.

17. The system of claim 14, wherein the predetermined metric indicates at least one job offer.

18. The system of claim 14, wherein the predetermined metric indicates at least one loan approval or disapproval.

19. The system of claim 14, wherein the predetermined metric indicates at least one credit score.

20. The system of claim 14, wherein the predetermined metric indicates at least one job promotion or at least one arrest.

\* \* \* \* \*